US008478566B2

(12) United States Patent
Glenn et al.

(10) Patent No.: US 8,478,566 B2
(45) Date of Patent: Jul. 2, 2013

(54) SYSTEMS AND METHODS FOR COMPUTING EMISSION VALUES

(75) Inventors: Michael Glenn, Toronto (CA); Oliver Meyn, Toronto (CA); Ron Dembo, Toronto (CA)

(73) Assignee: Zerofootprint Software Inc., Toronto, Ontario (CA)

( * ) Notice: Subject to any disclaimer, the term of this patent is extended or adjusted under 35 U.S.C. 154(b) by 861 days.

(21) Appl. No.: 12/605,809

(22) Filed: Oct. 26, 2009

(65) Prior Publication Data

US 2011/0099489 A1    Apr. 28, 2011

(51) Int. Cl.
*G06F 11/30* (2006.01)
*G06F 11/00* (2006.01)

(52) U.S. Cl.
USPC .......................... 702/182; 702/127; 702/188

(58) Field of Classification Search
USPC ................. 702/127, 182–185, 188; 703/6, 11
See application file for complete search history.

(56) References Cited

U.S. PATENT DOCUMENTS

| | | | |
|---|---|---|---|
| 7,440,871 B2 * | 10/2008 | McConnell et al. | 702/188 |
| 7,580,808 B2 * | 8/2009 | Bos | 702/127 |
| 7,647,207 B2 * | 1/2010 | McConnell et al. | 702/188 |
| 7,853,436 B2 * | 12/2010 | McConnell et al. | 702/188 |
| 7,877,235 B2 * | 1/2011 | McConnell et al. | 702/188 |
| 7,930,144 B2 * | 4/2011 | McConnell et al. | 702/188 |
| 8,000,938 B2 * | 8/2011 | Mcconnell et al. | 702/188 |
| 2003/0069743 A1 * | 4/2003 | Nordrum | 705/1 |
| 2006/0106635 A1 | 5/2006 | Ulrich et al. | |
| 2006/0229902 A1 * | 10/2006 | McGovern et al. | 705/1 |
| 2007/0255457 A1 * | 11/2007 | Whitcomb et al. | 700/273 |
| 2008/0015975 A1 * | 1/2008 | Ivchenko et al. | 705/37 |
| 2008/0015976 A1 * | 1/2008 | Sandor et al. | 705/37 |
| 2009/0132176 A1 * | 5/2009 | McConnell et al. | 702/23 |
| 2009/0292617 A1 * | 11/2009 | Sperling et al. | 705/26 |
| 2010/0042453 A1 * | 2/2010 | Scaramellino et al. | 705/7 |
| 2010/0138190 A1 * | 6/2010 | McConnell et al. | 702/188 |
| 2010/0185642 A1 * | 7/2010 | Higgins et al. | 707/758 |
| 2011/0137768 A1 * | 6/2011 | Onishi et al. | 705/30 |

OTHER PUBLICATIONS

US Environmental Protection Agency (EPA), "Procedures for Preparing Emission Factor Documents", Nov. 1997.*
International Search Report and Written Opinion dated Feb. 17, 2011, International Patent Application No. PCT/CA2010/001660.

* cited by examiner

*Primary Examiner* — Eliseo Ramos Feliciano
*Assistant Examiner* — Yaritza H Perez Bermudez
(74) *Attorney, Agent, or Firm* — Bereskin & Parr LLP/S.E.N.C.R.L., s.r.l.; Maya Medeiros

(57) ABSTRACT

A system and method for computing emission values. In one aspect, a system and method is described to include an input module operable to receive raw activity data to define a record for an activity; a data provisioning module operable to compute standardized activity data using the raw activity data; a location module operable to compute a location hierarchy for a given location; a factor data module operable to compute factor data for a given location hierarchy and time period; a reference data module operable to compute reference data; and an emission engine operable to compute at least one emission value for the activity based on the optimal emission equation.

27 Claims, 11 Drawing Sheets

SYSTEMS AND METHODS FOR COMPUTING EMISSION VALUES

FIELD

The described embodiments relate to systems and method for computing emission values, and in particular to systems and methods for computing emission values for an activity that generates an emission.

BACKGROUND

Governments, industries and individuals want to quantify and compare the emissions that result from human activity due to the increasing concern of their negative impact on our environment. Emissions may be defined in terms of green house gases such as water ($H_2O$), carbon dioxide ($CO_2$), methane ($CH_4$), nitrous oxide ($N_2O$) and ozone ($O_3$). However, emissions may include any substance emitted as a product of human activity including volatile organic compounds, fluorinated gases, chlorinated gases or virtually any chemical element or compound.

In order to quantify emissions, protocols that outline specific methods of measuring emissions have been developed, such as: the Green House Gas (GHG), Intergovernmental Panel on Climate Change (IPCC), Carbon Disclosure Project, and Bilan Carbone protocols, for example. Within a given protocol the emission intensity for a given source can vary depending on factors such as time, location, altitude, and temperature. As science and technology evolve more effective and accurate methods for measuring emissions are identified, more data is collected, and new protocols are developed. In addition, governments, industries and individuals may implement their own emission calculations specific to their needs.

Quantifying and comparing emissions is also becoming part of national and international governmental mandates. In response to the Kyoto Protocol, and other environmental and trade agreements, governments are implementing programs to track emissions and establish markets for the trading and commodification of emissions. In order to implement such programs it is becoming increasingly necessary for governments, industry and individuals to calculate and report their emission contributions.

Given the wide variety of emission protocols, emission intensities, and human activities that produce emissions, the data gathering, calculation, reporting and management of emissions can be an arduous task. Emission computation is susceptible to significant error if the protocols, intensities and information regarding human activities are not detailed, accurate and up to date.

Accordingly, there exists a need to accurately calculate emission values for an activity in view of the dynamic and potentially complex relationships that exist between science, emission types, emission protocols, emission intensities, activity information and factors such as time and location.

SUMMARY

In one broad aspect, at least one embodiment described herein provides a computer system for computing emission values, the computer system comprising a processor and a memory storing instructions, the instructions being executable to configure the processor to provide: an input module operable to receive raw activity data to define a record for an activity, wherein the raw activity data comprises: an activity type; a time interval; a location; a unit of measure; and a consumption value; a data provisioning module operable to compute standardized activity data using the raw activity data; a location module operable to compute a location hierarchy for a given location; a factor data module operable to compute factor data for a given location hierarchy and time period; a reference data module operable to compute reference data; and an emission engine operable to: query the reference data module for reference data; query the location module for a location hierarchy corresponding to the location of the activity; query the factor data module for factor data corresponding to the location hierarchy and at least a portion of the time interval for the activity; determine at least one optimal emission equation; and compute at least one emission value for the activity based on the optimal emission equation. The computer system may be further operable to store the raw activity data and the standardized activity data in an activity database.

In at least some embodiments, the input module is operable to interface with an application programming interface for a plurality of computing devices.

In some embodiments, the system further comprises a bulk upload module operable to receive raw activity data as bulk data from an enterprise client and provide the raw activity data to the input module.

In at least some embodiments, the computer system further comprises a question tree module operable to compute a question tree comprising a root node, a plurality of branch nodes, and a plurality of question nodes; provide a first question to a user based on the question tree; receive raw activity data in response to the first question; and provide the raw activity data to the input module. The question tree module may be further configured to: re-configure the question tree using at least some of the received raw activity data; provide a second question to the user based on the re-configured question tree; and receive additional raw activity data in response to the second question.

In at least some embodiments, the computer system further comprises an inventory and payment services module operable to: manage emission credit inventory; calculate a number of emission credits required to offset the computed emission value; compute emission credit market values; and initiate an emission offset transaction based on the number of calculated emission credits; computed emission credit market values; and emission credit inventory.

In at least some embodiments, the input module is further operable to receive a user identifier; and wherein the location module is further operable to customize a location hierarchy for a given user; and wherein the emission engine is further operable to receive the user identifier and to query the location module for the customized location hierarchy using the user identifier.

In at least some embodiments, the location hierarchy is a tree comprised of parent and children nodes; wherein each node corresponds to a geographic location; wherein each parent node corresponds to a geographic region at least as large as the aggregate of its children; and wherein each child node has only one parent node.

In at least some embodiments, the at least one optimal emission equation is associated with a time period, an emission type and a protocol.

In at least some embodiments, factor data comprises emission factors and wherein the factor data module is further operable to: associate each emission factor with at least one source, at least one location, a valid start date, and a valid end date; determine which emission factors are valid for at least a portion of the time interval for the activity; determine which emission factors are valid for locations defined by the location hierarchy; and rank the valid emission factors from most accurate to least accurate to compute a list of ranked valid emission factors.

In at least some embodiments, the factor data module is further operable to receive factor data specific to a user and associate the factor data with the user.

In at least some embodiments, the data provisioning module is further operable to: convert the time interval for the raw activity data into one or more sub-intervals of a standard time measure; create a standardized activity for each sub-interval of the standard time measure; convert the unit of measure and consumption value for the raw activity data into a standard unit of measure and a corresponding consumption value; associate a portion of the corresponding consumption value in the standard unit of measure to each standardized activity; and associate an input label with each standardized activity, where the input label is based on the activity type and defines how the emission value will be calculated.

In another broad aspect, at least one embodiment described herein provides a method for computing emission values, wherein the method is implemented on a processor and a memory storing instructions, the instructions being executable to configure the processor to perform operations comprising: receiving raw activity data to define a record for an activity, wherein the raw activity data comprises: an activity type; a time interval; a location; a unit of measure; and a consumption value; computing standardized activity data using the raw activity data; computing a location hierarchy corresponding to the location of the activity; computing factor data corresponding to the location hierarchy and at least a portion of the time interval for the activity; computing reference data; determining at least one optimal emission equation; and computing at least one emission value for the activity using the at least one optimal emission equation.

In at least some embodiments, the method further comprises computing a question tree, wherein the question tree comprises a root node, a plurality of branch nodes, and a plurality of question nodes; providing a first question generated using the question tree to a user; receiving raw activity data in response to the first question. In at least some embodiments, the method further comprises: re-configuring the question tree in response to at least some of the received raw activity data; providing an additional question generated using the re-configured question tree to the user; and receiving additional raw activity data in response to the additional question. In at least some embodiments, the method further comprises: traversing the question tree by dynamically repeating the steps of: re-configuring the question tree; providing an additional question; and receiving additional raw activity data.

In at least some embodiments, the method further comprises: managing emission credit inventory; calculating a number of emission credits required to offset the computed emission value; computing emission credit market values; initiating an emission offset transaction based on the number of calculated emission credits, computed emission credit market values, and the emission credit inventory.

In at least some embodiments, the method further comprises: receiving a user identifier corresponding to a user; customizing the location hierarchy for the user; and retrieving the customized location hierarchy using the user identifier.

In at least some embodiments, the standardized activity data defines one or more standardized activities, and the step of computing standardized activity data using the raw activity data comprises: converting the unit of measure and consumption value for the raw activity data into a standard unit of measure and a corresponding consumption value; and associating a portion of the corresponding consumption value in the standard unit of measure with each standardized activity.

In at least some embodiments, the step of computing standardized activity data using the raw activity data comprises: converting the time interval for the raw activity data into one or more sub-intervals of a standard time measure; and defining a standardized activity for each sub-interval of the standard time measure. In at least some embodiments, computing the at least one emission value for the activity comprises computing at least one emission value for each standardized activity. In at least some embodiments, the step of computing standardized activity data using the raw activity data comprises: associating an input label for the activity based on the activity type, wherein the input label defines how the emission value will be calculated.

In at least some embodiments, the step of determining at least one optimal emission equation comprises: storing a plurality of emission equations in a database, wherein each emission equation is associated with a protocol and an activity type; determining a set of emission equations from the plurality of emission equations, wherein each emission equation in the set of emission equations matches at least some of the standardized activity data, the computed reference data and the computed factor data; ranking each emission equation in the set of emission equations, wherein the rank relates to the accuracy of the emission equation given the standardized activity data, the computed reference data and the computed factor data; and selecting the at least one optimal emission equation from the ranked set of emission equations.

In at least some embodiments, the method further comprises: receiving one or more emission equations specific to a user and associating the one or more emission equations with a user identifier.

In at least some embodiments, the method further comprises receiving factor data specific to a user and associating the factor data with the user.

In at least some embodiments, the factor data comprises factors, and the method further comprises: associating each factor with at least one source, at least one location, a valid start date, and a valid end date; determining which factors are valid for the time period of the standardized activity data; determining which factors are valid for locations defined by the location hierarchy; ranking the valid factors from most accurate to least accurate to compute a list of ranked valid factors.

In another broad aspect, at least one embodiment described herein provides a physical computer-readable medium upon which a plurality of instructions are stored, the instructions for performing the steps of the method for computing emission values described herein.

BRIEF DESCRIPTION OF THE DRAWINGS

For a better understanding of the various embodiments described herein, and to show more clearly how they may be carried into effect, reference will now be made, by way of example only, to the accompanying drawings which show at least one exemplary embodiment, and in which.

Figure 1:
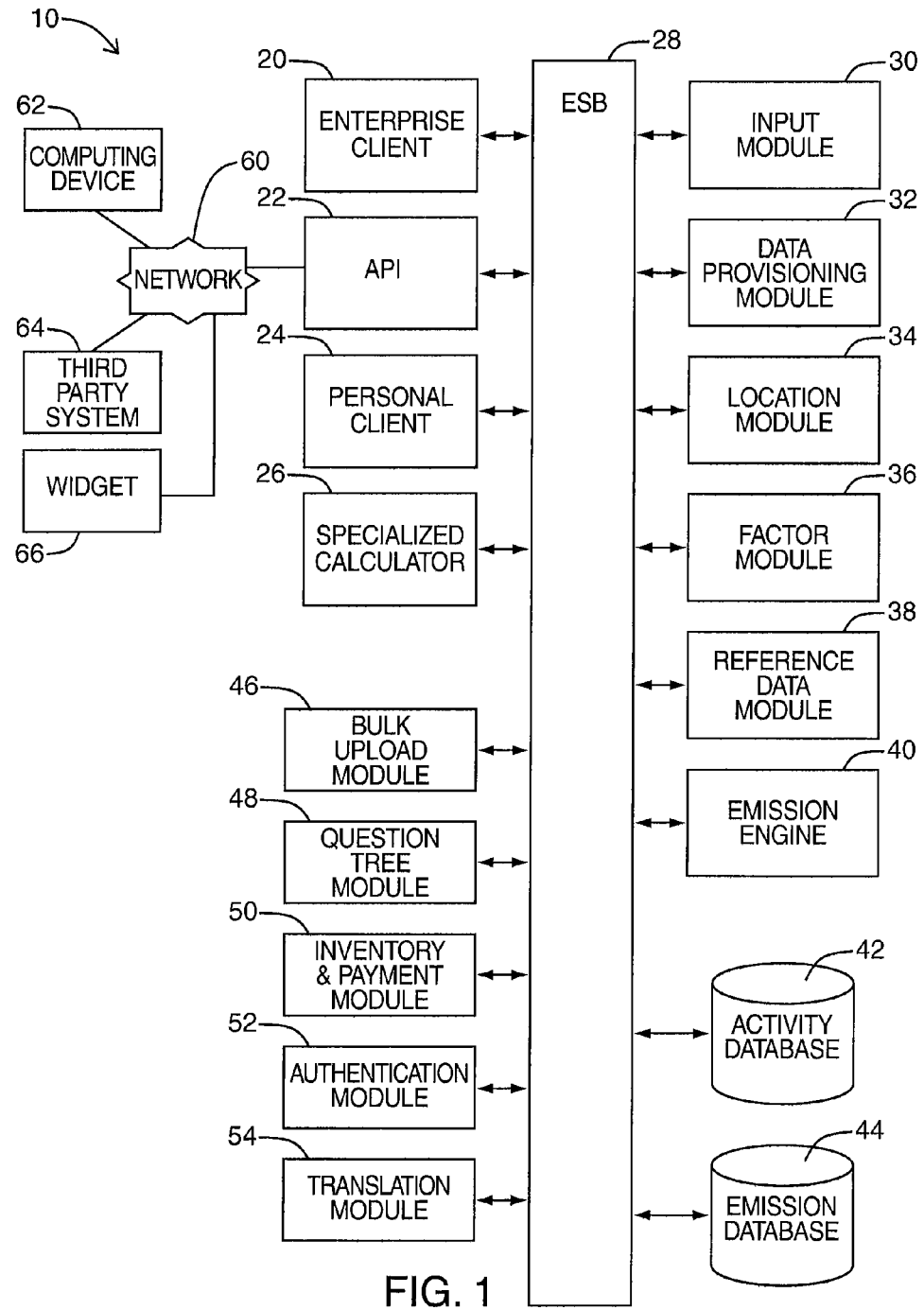
FIG. 1 is a block diagram of a system for computing an emission value for an activity in accordance with an example embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. For example and without limitation, the programmable computers may be a server, network appliance, set-top box, embedded device, computer expansion module, personal computer, laptop, personal data assistant, or mobile device. Program code is applied to input data to perform the functions described herein and generate output information. The output information is applied to one or more output devices, in known fashion. In some embodiments, the communication interface may be a network communication interface. In embodiments where elements of the invention are combined, the communication interface may be a software communication interface, such as those for inter-process communication (IPC). In still other embodiments, there may be a combination of communication interfaces.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

FIG. 1 is a block diagram illustrating an exemplary embodiment of the system 10 for computing emission values. System 10 has a processor and a memory storing instructions, the instructions being executable to configure the processor to provide a number of functional elements including: an input module 30, a data provisioning module 32, a location module 34, a factor data module 36, a reference data module 38, an emission engine 40, an activity database 42, and an emissions database 44. An enterprise service bus (ESB) 28 enables asynchronous communication and data exchange between the system 10 components. An enterprise client 20, a personal client 24, an application programming interface (API) 22 and specialized emission calculators 26 can access the functionality of the emission engine 40 and other components directly through the ESB 28. A computing device 62 (e.g. personal computer, mobile device, cell phone, personal data assistant), third party system 64, and a widget 66 can access the functionality of the emission engine 40 and other components through a network 60 and the API 22. The components of the system 10 are modular and can function independently or together.

The input module 30 is operable to receive raw activity data in order to define a record for an activity. The input module 30 is further operable to receive a user or client identifier to associate the raw activity data with the user of the system 10. The input module 30 may receive the raw activity data automatically through connectors or manually through direct user input, spreadsheets defined by templates, supplier bills, the enterprise client 20, the personal client 24, the API 22, the bulk data upload module 46, and the question tree module 48, for example.

An activity is an event that generates emissions and occurs relative to a geographic location over a defined period of time. An activity generally includes a measure relating to the consumption of a resource (e.g., electricity, gasoline, natural gas, water) or the release of an effluent (e.g., mercury or methane) into the environment.

The raw activity data defines the record of the activity and generally includes the following data elements:
- an activity type (e.g., driving, flying, electricity, heating, waste, recycling, composting, and paper)
- a time interval (e.g., start time, end time);
- a location where the activity occurred (e.g., Toronto, Mike's office);

a unit of measure (e.g., kg, kWh, ton); and a consumption value (e.g., amount of gas consumed).

The raw activity data may further include a cost value and a unit of currency. Additional example activity types include: accommodation, boating, office supplies, household material goods, packaging, shipping, power generation, renewable energy, agricultural applications, refrigerants, food, building materials, public transportation, raw material acquisition, manufacturing, and material processing.

The data elements of the raw activity data may contain sub-data elements or nested data elements. For example, the activity type 'electricity' may have nested data elements such as: grid, green source, on-site, and private contract. The activity type 'heating' may have nested data elements such as: fuel, and electric, cogenerated, and geothermal. The activity type 'flying' may have nested data elements such as: commercial, private leased, and private owned.

The data provisioning module 32 is operable to store, standardize, validate and classify data received by the system 10 and the input module 30. The data provisioning module 32 ensures data integrity and converts data into common units of measure so that, for example, kilograms are not directly compared to pounds.

When the input module 30 receives raw activity data, the data provisioning module 32 is operable to store the raw activity data in an activity database 42. The data provisioning module 32 may associate the raw activity data with a user identifier. This enables access to a copy of the data as received and allows a user to review their specific input in order to make edits.

The data provisioning module 32 is further operable to convert the raw activity data into standardized activity data and store the standardized activity data in the activity database 42.

The data provisioning module 32 is operable to convert the raw activity data into a standard unit of measure. The data provisioning module 32 is operable to store the original unit of measure for the raw activity data. This allows the data provisioning module 32 to convert system 10 generated data into a unit of measurement appropriate for the data consumer, such as metric measures for Canada and imperial measures for the U.S.

The data provisioning module 32 is further operable to convert the raw activity data into a standard time measure, such as one day. To do so, the data provisioning module 32 may convert the raw activity data for one activity into multiple standardized activities, where the time interval for each standardized activity is the standard time measure. For example, the raw activity data may be an electricity bill for thirty days. The data provisioning module 32 evenly distributes raw activity data for the activity into thirty standardized activities, each having a time interval of one day. The standard time measure may also be one second, one millisecond, etc. for real-time power monitoring systems and the like. The data provisioning module 32 records the standard time measure to allow for subsequent calculations and comparisons.

The data provisioning module 32 is further operable to associate an input label with each standardized activity. The input label provides the system 10 with a context for the standardized activity and defines how the emission value will be calculated. The input label generally depends on the activity type. For example, an input label for the activity type 'driving' may be 'distance driven' and an input label for the activity type 'waste' may be 'waste consumed'.

The location module 34 manages data relating to locations. The emission of an activity depends on the location of the activity. For example, the electricity used in Ontario has a significantly lower carbon footprint than electricity used in Alberta because 80% of the electricity provided in Ontario comes from either atomic or hydro electric sources whereas 80% of the electricity used in Alberta comes from coal fired generators. As another example, different countries use different protocols (e.g., GHG, Bilan Carbone) to calculate emission values. The location must be factored in when determining how an emission value should be calculated in order to comply with a given protocol.

The location module 34 communicates with the other components of system 10 through the ESB 28 using messages. A component of the system 10 may send a message request to the location module 34 regarding an activity that occurs at a particular location. In response, the location module 34 will compute and return a location hierarchy for the location associated with the activity. The location module 34 may also receive a user identifier along with the request in order to compute a location hierarchy specific to the user.

Figure 2:
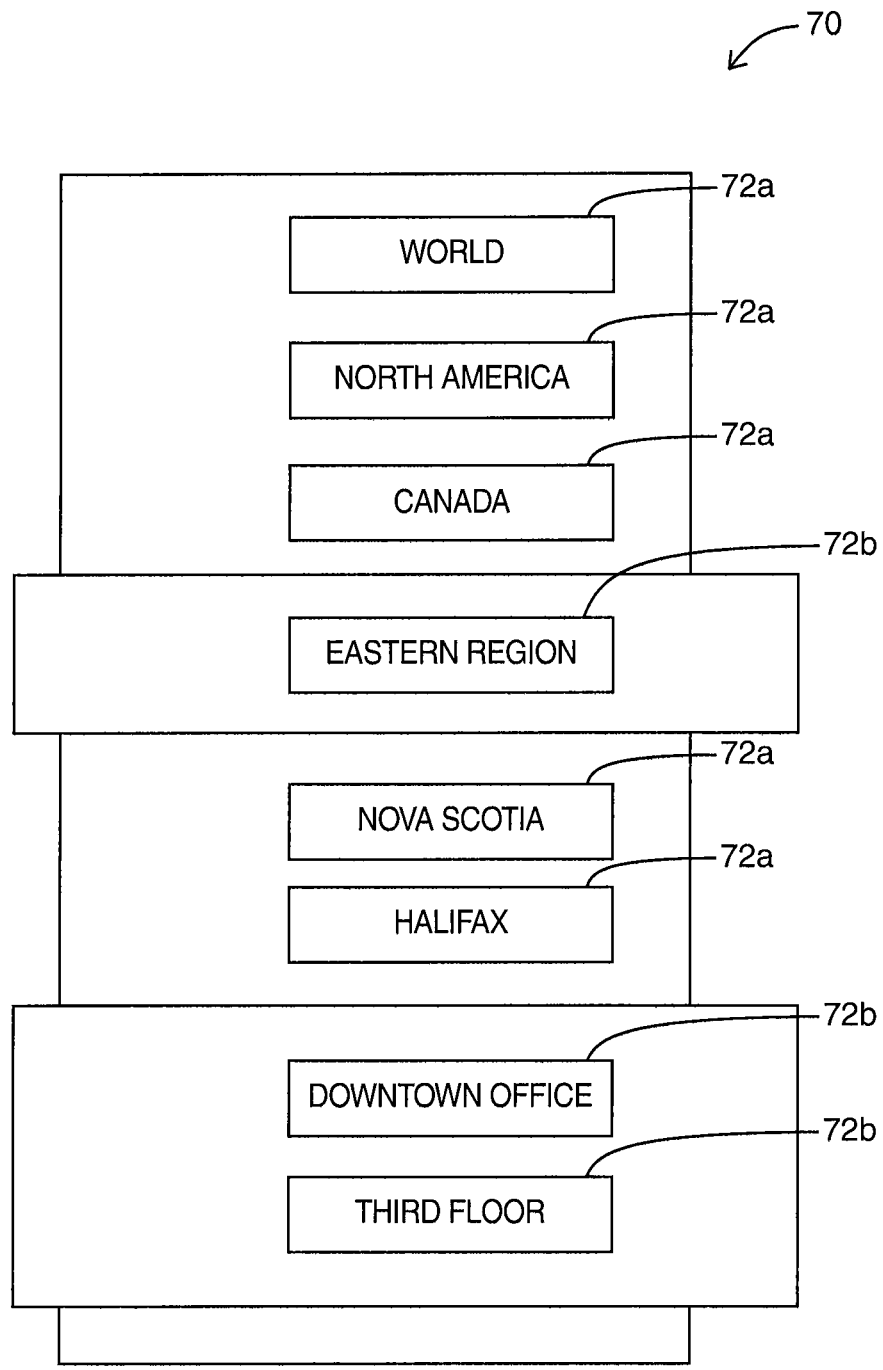
FIG. 2 is a block diagram illustrating an example location hierarchy.
Figure 3:
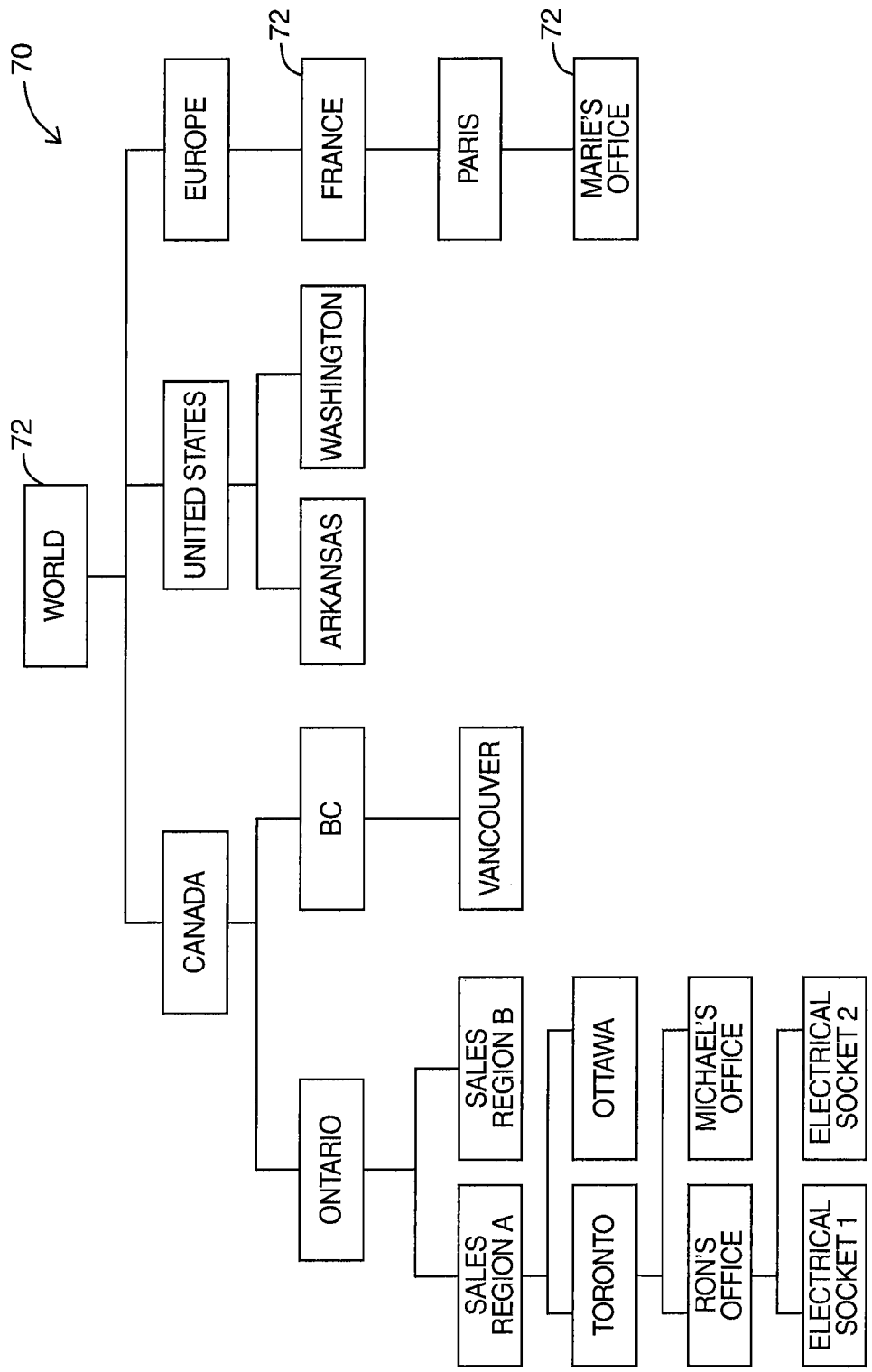
FIG. 3 is a block diagram illustrating another example location hierarchy.

FIG. 2 is a block diagram illustrating an example location hierarchy 70. FIG. 3 is a block diagram illustrating another example location hierarchy 70. The location module 34 uses location hierarchies as a mechanism to organize geographic locations relative to other geographic locations. A location hierarchy 70 comprises one or more location nodes 72 arranged as a graph or tree relative to other location nodes 72. A location node 72 may be a parent node (e.g. "world"), a child node (e.g. "third floor"), or both a parent and child node (e.g. "Canada").

As shown in FIGS. 2 and 3, a location hierarchy 70 may organize location nodes 72 in a top-down hierarchy of ever increasing granularity, such as World-Continent-Country-Business Area-Province-City-Office.

The location module 34 is further operable to customize location nodes 72b (FIG. 2) for a user to reflect the user's specialized view of the world. By creating custom location nodes 72b a user can create arbitrary levels of abstraction specific to their view of how the world is organized. Examples include multi-country regions, sales regions, buildings, offices, and electrical outlets. The location module 34 may receive the user identifier along with the location of the activity in order to compute a customized location hierarchy specific to the user.

As shown in FIG. 2, the location module 34 may compute a location hierarchy using standard location nodes 72a (e.g., cities, states, provinces) applicable to all users and overlay custom location nodes 72b (e.g., 'downtown office') applicable only to specific users. If two users have custom location nodes 72b, the location module 34 may compute one location hierarchy 70 comprised of standard and custom location nodes 72a,b for one user and a different location hierarchy 70 for the other user. The same standard location nodes 72a will be included in both location hierarchies.

Although FIGS. 2 and 3 illustrate the location hierarchy 70 as a tree or directed graph, the location module 34 may organize standard custom location nodes 72 as a graph where a child node 72 can have multiple parent nodes 72. The location module 34 will use the graph to compute a location hierarchy 70 specific to the user that is a tree or directed graph for the emission engine 40, factor data module 36 and reference data module 38. This allows the components to directly traverse up the location hierarchy 70 from a given location node 72 (child node) without encountering multiple paths due to the child node 72 having multiple parent nodes 72.

The factor data module 36 manages factor data by associating each factor with at least one source, at least one location, a valid start date, and a valid end date. The factor data module

36 may also associate factors with a user, where only a specific user has permission to use the factor.

Factors provide numerical data (factor values) for use by the emission engine 40 when calculating emission values. A very accurate way to measure emissions would be to monitor them directly as they are emitted. If real time monitoring is not feasible or possible, a factor (i.e., an emission factor) provides a mechanism to estimate the rate at which a pollutant is released into the atmosphere (or captured) as a result of the activity (or standardized activity). An emission factor is therefore measured in units of an emission type per unit of activity (e.g., grams of CO2 per km driven). Other examples include, pounds of SO2 per bushel of Wood Burned, milligrams of Volatile Organic Compounds per hour of Dry Cleaning, and liters of H2O per Dishwasher Cycle.

Emission factors may depend upon numerous variables including: the location of the activity (e.g., percentage of electricity produced by coal in the United States); the product associated with the activity (e.g., approximate gas mileage for a Toyota Prius); the service associated with the activity (e.g., CO2 emitted per passenger for a flight from Toronto to Chicago); time intervals (e.g., percentage of electricity produced by coal in Toronto in July 2008); the scientific methods used to calculate them; the source category of an emission; the temperature at which the emission occurred; and many others. Emission factors are approximations or averages that reflect constantly changing real world scenarios.

The factor data module 36 can store factor data locally in a database or access data stored remotely in third party databases. The factor data may be derived from protocols (e.g., GHG, IPCC, CDP), industry standards, emission databases, internal calculations, industry associations (e.g., EPA) and user specific databases, for example.

A component of the system 10 may send a message request to the factor data module 36 for emission factors for the standardized activity, where the message request includes the location hierarchy and the time interval. In response, the factor data module 36 is operable to determine which factors are valid for the time period of the standardized activity data and the locations defined by the location hierarchy.

As noted above, factors depend on the location of an activity. The factor data module 36 will attempt to determine the most specific factors using the location hierarchy. For example, the location hierarchy may be Toronto-Ontario-Canada-World. If factors specific to 'Toronto' are not available or valid for the specified time interval, then the factor data module 36 will traverse successively up the location hierarchy to parent nodes of 'Toronto' and attempt to compute factors specific to Ontario, and then to Canada, etc.

If the factor data module 36 determines that there are multiple valid factors available for a given location and time interval, then the factors module 36 ranks the valid factors from most accurate to least accurate to compute a list of ranked valid factors. The factor data module 36 determines which valid factors are the most accurate for the given location hierarchy and time interval.

The reference data module 38 is operable to compute reference data relevant to each standardized activity. The reference data module 38 may access reference data stored locally in a database or remotely in third party databases (e.g., EPA fuel guide database). All reference data has a specific type. Examples of different types of reference data include: fuel efficiency, fuel type, electricity type, waste type, paper size, car name, etc.

The data provisioning module 32 may tag raw activity data elements as different types of reference data for access by the reference data module 38. For example, the activity may be the use of 2000 kwh of electricity in the Toronto Office over a period of 3 months, where 90% is obtained from the grid and 10% is obtained from green sources. The type of reference data may be 'electricity type' and the specific reference data value for this activity will be '90% grid' and '10% green'. When an emission value is computed for the grid and another emission value is computed for the green sources, the system 10 may use the reference data '90% grid' and '10% green' in order to compute the emission value for the activity as a whole.

The factor data module 36 and the reference data module 38 are interconnected and tightly coupled. A given factor may be independent of reference data or may depend on some type of reference data. For example, an emission factor for compost is independent of reference data and depends only on the location of the activity. However, a factor for fuel consumption depends on the reference data 'fuel type' (e.g., gas, diesel). Accordingly, the factor data module 38 may directly access the reference data module 38 when computing factors relevant to the location hierarchy and time interval.

The emission engine 40 is operable to compute at least one emission value for the activity. The emission value is the amount of emissions for an activity measured in a unit such as tonnes of CO2e (carbon dioxide equivalents), tonnes of CH4e (methane equivalents), and cubic metrics of water, for example.

The emission engine 40 receives a request from the data provisioning module 32 to compute one or more emission values for each standardized activity and receives data for each standardized activity (e.g., the input label, the activity type, time interval, location). The emission engine 40 may compute an emission value for the activity as a whole using the emission values computed for the standardized activities that make up the activity. In addition, the emission engine 40 may compute multiple emission values for a given standardized activity.

The emission engine 40 is operable to query the location module 34 for a location hierarchy using the location of the standardized activity. The emission engine 40 is operable to query the reference data module 36 for relevant reference data and the factor data module 36 for relevant factors using the location hierarchy and the time interval for the standardized activity.

As noted above, factors may only be valid for a specific location, time interval, protocol, etc. The factor data module 36 will return the most specific and accurate valid factors for each standardized activity, and may return a different set of valid factors for one standardized activity than for another standardized activity even though both are related to the same activity. For example, an activity may take place from June 2008 to August 2008 and one factor may be the most accurate but only valid for July 2008. All standardized activities that take place in July will use that factor but the standardized activities that take place in June and August will use another factor.

Dividing an activity into multiple standardized activities allows the most accurate and specific factors to be used to calculate the emission value for that standardized activity, even though the factors may not be valid for the entire time interval of the activity. Increasing the granularity of the standardized activity time intervals and the granularity of the factor data time intervals allows for more accurate emission calculations.

If protocols, factors, or emission equations are added or updated at some point in the time interval for the activity, this will be reflected in the calculations for an individual standardized activity as the activity as a whole is broken down into a standard time measure such as days. Further, historical data (e.g., activity data saved in the activity database) may be used to re-calculate emission values as factors or protocols are updated and created.

The emission engine 40 determines one or more optimal emission equations given the data related to the standardized activity (e.g., input label, activity type, reference data, factors).

The emission engine 40 maintains a database of emission equations and associates each emission equation with a valid time period, the source of the equation (e.g., a protocol) and an activity type. Sources for equations include scientific data, protocols, government programs, reports, industry standards, specific customers, etc. For example, typically a protocol, such as GHG, will define a set of equations to use for calculations in order to comply with the protocol. In addition, specific customers may develop their own internal equations for use by that specific customer only. The database of emission equations can be updated with new equations as new science is developed, new protocols are created, or existing protocols are updated. When an existing equation is updated with a new version, the system 10 will implement versioning to keep track of the old equation and all subsequent versions.

Equations may be implemented using a domain specific language, and are generally made up of one of more of the following variables:
Standardized activity data (e.g., input label, activity type, location, time interval, consumption value);
Reference data;
Emission factors;
Another equation result (e.g., a sub-equation within the equation); and
Protocol constants (e.g., radiative force of air travel).

The emission engine 40 determines a set of emission equations that match at least some of the standardized activity data, the computed reference data and the computed factor data. Equations may be valid for a protocol, location, emission type, and time interval. The emission engine 40 queries the database for valid emission equations that match the standardized activity data, location hierarchy, reference data, and factors.

For example, if there is no valid equation for the specific location of the activity, then the emission engine 40 will successively traverse up the location hierarchy to the first parent node to determine whether there is a valid equation for that location, etc.

If the set of equations includes multiple emission equations, then the emission engine 40 ranks or scores the equations with reference to the specific user, standardized activity data, location hierarchy, reference data, and emission factors in order to determine the optimal emission equation for this specific standardized activity. The emission engine 40 may associate metadata regarding accuracy with each equation in order to rank the emission equations.

Finally, the emission engine 40 selects an optimal emission equation from the ranked set of emission equations for use in calculating the emission value.

Once the optimal emission equation is determined, the emission engine 40 computes emission values for the standardized activity by applying the standardized activity data, reference data, and factors to the optimal emission equation. The emission engine 40 will compute at least one emission value for each standardized activity in order to compute an emission value for the activity as a whole. The emission equation may be associated with a specific protocol, which may dictate which emission factors should be used for the calculation and returned by the factor data module 36.

Accordingly, the optimal emission equation may be selected prior to computing which factors to use for the time interval and location.

The emission engine 40 is further operable to store the at least one emission value in an emission database, or transmit the emission value to the ESB 28 for access by the enterprise system 20, the API 22, the personal system 24 or a specialized calculator 26.

If emission equations and factors are added or updated, then the emission engine 40 can re-calculate emission values using historical activity data stored in the activity database 42 using the latest and most accurate equations and factors. For tracking purposes, the emission engine 40 can associate each computed emission value with the emission equation (and version) and factors used for its calculation.

The components of system 10 are modular and can function independently or together. The emission equations, factors, and reference data can be updated, changed, expanded, and tested independently of the other components. The system 10 provides a suite of services to users (commonly referred to as SaaS or software/hardware as a service) and does not require the user to maintain their own software programs, server systems or databases. Components of the system 10 can interact with third party system components instead of the local components (e.g., use a third party reference data component instead of the local reference data module 38, for example). A third party system can also interact with the entire system 10 or one or more individual components for automated data exchange and bulk data upload into system 10.

Figure 4:
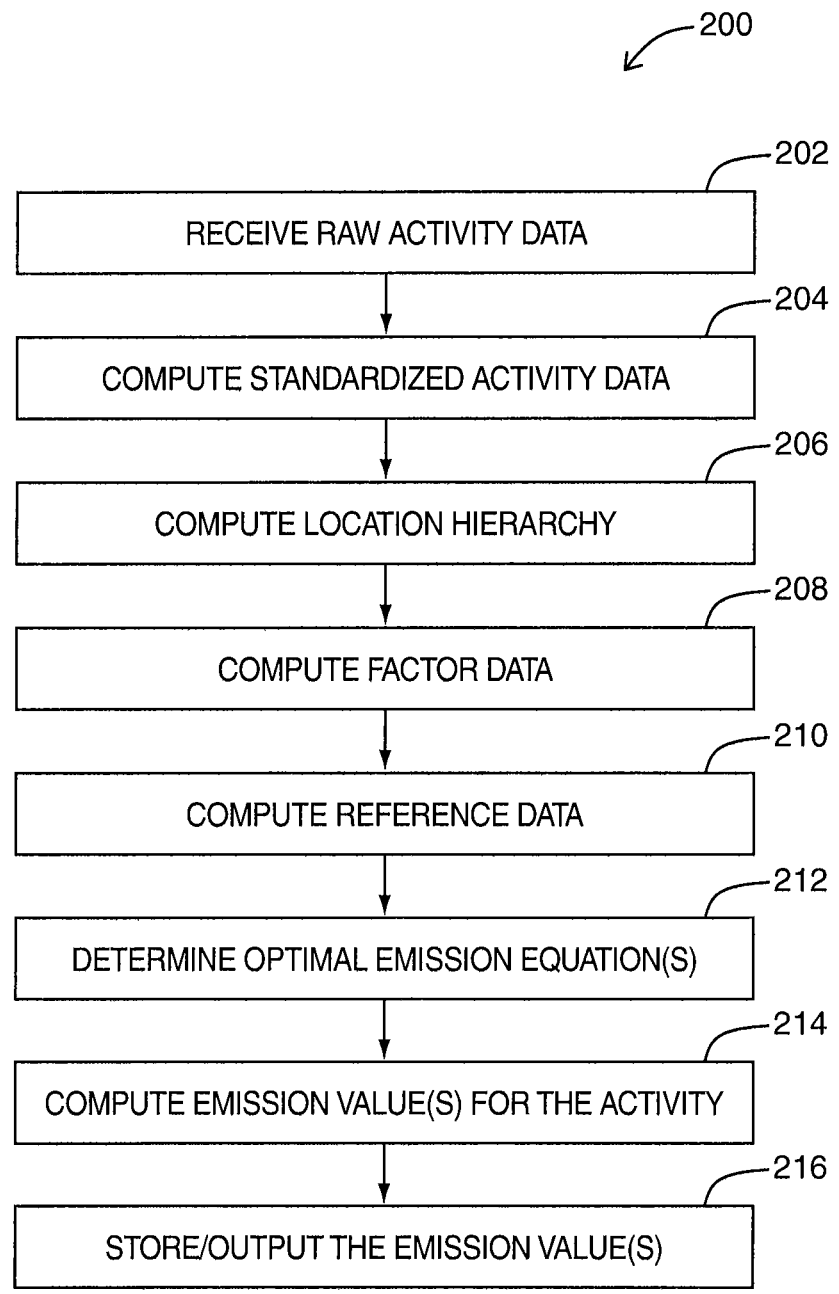
FIG. 4 is a flowchart diagram of a method for computing an emission value for an activity in accordance with an example embodiment.

FIG. 4 is a flowchart diagram that illustrates the basic steps 200 taken by system 10 to compute emission values for an activity.

The process begins at step (202), where the input module 30 receives raw activity data to define a record for an activity. The raw activity data may include: an activity type; a time interval; a location; a unit of measure; and a consumption value. System 10 stores the raw activity data in an activity database 42.

For example, the activity may be a three-day SUV rental from Dec. 30, 2007 through Jan. 1, 2008, and the raw activity data may include:
Activity type: driving
Vehicle type: Ford Escape (SUV)
Fuel efficiency: 10 L/100 km
Total distance: 750 km
Time interval: 3 days (Dec. 30, 2007, Dec. 31, 2007, Jan. 1, 2008)
Fuel type: Gasoline engine
Unit: km
Fuel consumption: 75 L
Location: Toronto At step (204), the data provisioning module 32 converts the raw activity data into one or more standardized activities, and stores the standardized activity data in the activity database.

For this example, the data provisioning module 32 converts the raw activity data into three standardized activities, each with a 1 day time interval. The data provisioning module 32 divides the total distance evenly (250 km/day) and distributes the fuel consumption evenly (25 L/day) over the three standardized activities. The data provisioning module 32 determines that the input label for each standardized activity is 'distance driven' based on the activity type.

At step (206), the location module 34 computes a location hierarchy corresponding to the location of the activity. Referring to the example, the location hierarchy may be Toronto-Ontario-Canada-World.

At step (208), the factor data module 36 computes factor data corresponding to the location hierarchy and the time intervals for each standardized activity. As noted above, in some instances the optimal emission equation will be selected (see step 212) before the factor data module 36 computes the factor data because the emission equation may be associated with a specific protocol which may dictate which factors to use.

As noted above, the factor data module 36 associates each factor with a source (e.g., protocol, third party database), location(s), a valid start date and a valid end date.

The factor data module 36 determines which factors are valid for the location hierarchy and the time interval of the standardized activity. If the factor data module 36 determines that multiple valid factors are available for the standardized activity then the factor data module 36 ranks the valid factors from the most accurate to the least accurate to compute a list of ranked valid factors each standardized activity. The accuracy of each factor may be associated with each factor as metadata and used by the factor data module 36 to rank the factors.

The factor data module 36 returns the list of ranked valid factors to the emission engine 40 in order to calculate the emission values for each standardized activity.

Referring to the example, the factor data module 36 may determine that three emission factors are associated with SUVs: (1) a factor sourced from the GHG protocol valid for Ontario for January-December 2007; (2) a factor sourced from the Ontario Government valid for January-December 2008; (3) a factor sourced from an independent one-day study by a Toronto car company valid for Dec. 31, 2007. The factor data module 36 will rank each of these factors based on accuracy and compute the following ranked factor list: (3), (1), (2). The emission value for the standardized activity for Dec. 30, 2007 will be computed using factor (1) as it is the only valid factor available. The standardized activity for Dec. 31, 2007 will use factor (1) as it is more accurate then the other valid factor (2). The emission value for the standardized activity for Jan. 1, 2008 will be computed using factor (3) as it is the only valid factor available.

At step (210), the reference data module 38 computes reference data relevant to the standardized activities. As noted above, raw activity data may be stored as reference data. For example, 'vehicle type' (SUV), 'name' (Ford Escape), 'fuel efficiency' (averages 10 L/100 km) and 'fuel type' (gasoline engine) may be stored as reference data and retrieved by the reference data module 38 for use in the emission value calculation. If only some raw activity data is provided, such as only the name of the SUV (Ford Escape), then the reference data module 38 may lookup reference data associated with the provided raw activity data, such as the fuel efficiency for a Ford Escape, in a database of fuel efficiencies that may be maintained by government or automobile industry association (e.g., EPA database of car fuel efficiencies).

At step (212), the emission engine 40 determines at least one optimal emission equation using at least some of the standardized activity data, the reference data and the factor data.

The emission engine 40 is operable to store emission equations in the emission database and associate each emission equation with a valid time interval, a protocol and an activity type. The emission engine 40 searches the emission database to determine a set of emission equations that match at least some of the standardized activity data, the computed reference data and the computed factor data.

The emission engine 40 ranks each emission equation in the set of emission equations with respect to the accuracy of each emission equation given the standardized activity data, the computed reference data and the computed factor data.

Finally, the emission engine 40 selects an optimal emission equation from the ranked set of emission equations for use in calculating the emission value.

Referring to our example, the emission engine 40 computes and ranks a set of equations for computing the emission value (e.g., $CO_2$ emissions) for gasoline consumed for each standardized activity. The ranked set of equations may include the United Nations protocol equation and GHG protocol equation, where the UN protocol equation is more accurate but only valid from Jan. 1, 2008.

For example, the optimal emission equation may be: distance_driven*car_fuel_efficiency*emission_factor (car_fuel_type, location, date) where distance_driven is the input label, car_fuel_efficiency is reference data; emission_factor(car_fuel_type, location, date) is factor data and reference data.

At step (214), the emission engine 40 computes at least one emission value for the activity using the at least one optimal emission equation. The emission engine 40 may compute multiple emission values in order to compute a final emission value for the activity. For example, the emission engine 40 may compute an emission value for each of the standardized activities, and then aggregate all the emission values to compute a final emission value for the entire activity.

For the above example, for the first and seconds day of the journey, the emission engine 40 calculates the emission value (e.g., $CO_2$ emissions) using the GHG Protocol equation. For the third day of the journey, the emission equation changes within the time interval of the activity when the United Nations Protocol becomes valid. The emission values calculated for the first and second day using the GHG protocol equation are recorded and the new UN Protocol equation is used to calculate the emission value for the third day of the journey. Accordingly, the emission engine 40 may calculate a value for each standardized activity using the most accurate and valid equation for that standardized activity, instead of using the same equation to calculate the emission value for the activity as a whole. This allows the emission engine 40 to use the most accurate emission equation for part of the calculation even though the emission equation is only valid for a portion of the time interval of the whole activity (i.e., Dec. 30, 2007 to Jan. 1, 2008).

The emission engine 40 calculates the total emissions for the journey as the sum of the emission values (e.g., $CO_2$ emitted) for each of the three days (standardized activities) that comprised the activity.

At step (216), the system 10 stores the at least one emission value in an emission database. The system 10 may also transmit the emission values. Other components such as the enterprise client 20 or the API 22 can access the computed emission value(s) through the ESB 28.

Another example activity may be providing 2000 kWh of electricity to a Toronto office from Jan. 1, 2007 to Mar. 3, 2007, where 90% of the electricity came from the grid and 10% came from green sources. Generally, the steps will be as described above, subject to modifications described below.

The input module 30 receives the following raw activity data to define the record for the activity:
Activity type: electricity
Time interval: Jan. 1, 2007 to Mar. 3, 2007
Consumption value: 2000 kWh
Reference data: 90% grid; 10% green
Location: Toronto office The data provisioning module 32 breaks the raw activity data into standardized activities of a standard time measure (one for each day) and converts to standard units. The data provisioning module 32 determines two input labels: green_electricity_consumed and grid_electricity_consumed. Associating two input labels with each standardized activity provides an indication to the emission engine 40 that two emission values will be calculated for each standardized activity.

The factor data module 36 and reference data module 38 compute the factor and reference data for each standardized activity given the location hierarchy and time interval. To avoid repetitive lookups, the factor data module 36 and reference data module 38 may store the computed data in a cache for use in determining the two emission values for each standardized activity (green and grid electricity). The cached data may also be re-used to compute the emission values for all of the standardized activities, as some factor and reference data may be valid for more then one standardized activity.

The emission engine 40 will determine optimal emission equations and compute two emission values for each standardized activity, one emission value for green_electricity_consumed and another emission value for grid_electricity_consumed. In order to determine a total emission value for each standardized activity, the emission engine 40 will apply the reference data 10% green and 90% grid and combine the calculated emission values.

This example illustrates that raw activity data may be composed of nested raw activity data elements (green and grid) which results in multiple emission values being computed for each standardized activity (green_electricity_consumed and grid_electricity_consumed).

As another example, the activity may be the waste generated by the Toronto office from Feb. 1 to 28 2009. The input module 30 receives the raw activity data from a bill issued by the supplier Waste Management Inc., which breaks 1000 KG of waste into the following types of waste:

Metals—8%
Glass—12%
Food scraps—6%
Paper—16%
Cardboard—10%
Plastics—40%
Other—8%

If a bill issued by a supplier does not provide a break down of waste types and only provides the total amount of waste generated, then the data provisioning module 32 may access industry averages or customer averages in order to estimate a break down.

The data provisioning module 32 stores reference data for each type of waste (e.g., metals—8%) for later recall by the emission engine 40. The data provisioning module also determines that the activity type is composed of 7 reference data types (e.g., metals, glass). The data provisioning module 32 converts the raw activity data into standardized activities and determines that the input label is 'waste_consumed' based on the activity type. The emission engine 40 determines that the optimal emission equation is: waste_consumed*emission_factor(waste_type)

The emission engine 40 calculates 7 emission values for each standardized activity, one for each type of waste and recalls the reference data relating to the type of waste (e.g., metals—8%) in order to calculate a final emission value for each standardized activity.

Another example activity similar to waste is recycling. The raw activity data and the reference data is similarly broken down into the types of material recycled (e.g., metal, glass, paper, cardboard, plastic, etc.) and the input label is 'recycling_consumed'.

As another example, the activity may be consuming 200 KG of compost in California in June 2008. The data provisioning module 32 will determine that the input label is 'compost_consumed'. For this example, no reference data may be required since the factor data module 36 may maintain only one emission factor for all things compostable. The emission engine 40 may compute a negative emission value for this activity type.

As a further example, the activity may be flying from Toronto (YYZ) to London (LHR) on Aug. 31, 2009. The data provisioning module 32 will convert the raw activity data into one standardized activity, since the system 10 may use the default time interval of one day for all flights regardless if the flight spans multiple days. For the activity type 'flying', the data provisioning module 32 pre-processes the raw activity data to determine the flight distance by sending a request to the factor data module 36. The reference data module 38 is operable to maintain a database of airport information (e.g., list of airports, IATA code, longitude, latitude) to lookup data for the departure location and destination location. The reference data module 38 may calculate the flight distance using an iterative approach such as the Vincenty algorithm and then returns the calculated flight distance to the data provisioning module 32. The reference data module 38 may provide the emission engine 40 with multiple emission factors for the flight, depending on the altitude reached during the flight, the applicable protocol, the type of the airplane, etc.

As another example, the activity may be heating a home in Vancouver from Mar. 1 to 31 2009, using 1000 m$^3$ of natural gas. The input module 30 may receive a bill from one or more suppliers. The data provisioning module 32 may create a record for each supplier, or if a record for the supplier already exists then it may recall previously stored information regarding the supplier. In this example, the home is heated using only natural gas, however, if multiple gas or fuels types are used then the data provisioning module 32 can create standardized activities for each gas or fuel type as in the electricity example. Alternatively, the different fuel types could form sub-types of a single standardized activity as in the waste example. For this example, the reference data includes fuel type and the input label is fuel_consumed. In this example, the amount of fuel used was provided as the fuel dimension volume (e.g., 1000 m$^3$), however, the fuel may also be provided in another fuel dimension such as energy (e.g., 10,000 BTU).

As a further example, the activity may be using 500 sheets of 8.5×11 office paper from Jan. 1 to 31 2008 at the Montreal office. The reference data would be paper_type (office paper) and paper_size (8.5×11) and the input label would be 'paper_consumed'. The amount of paper used may be expressed in sheet or other units such as reams. The emission engine 40 may use the following optimal emission equation, factor data and reference data:
paper_consumed*paper_size.area*paper_type*emission_factor(paper_type)

The above described activities are examples only and the system 10 may compute an emission value for many other activities such as dry cleaning, washing a car, watering the lawn, etc.

The components of the system 10 may implement the functionality described herein and organize the data used, generated, and updated by system 10 by defining multiple data classes and tables.

Figure 5A:
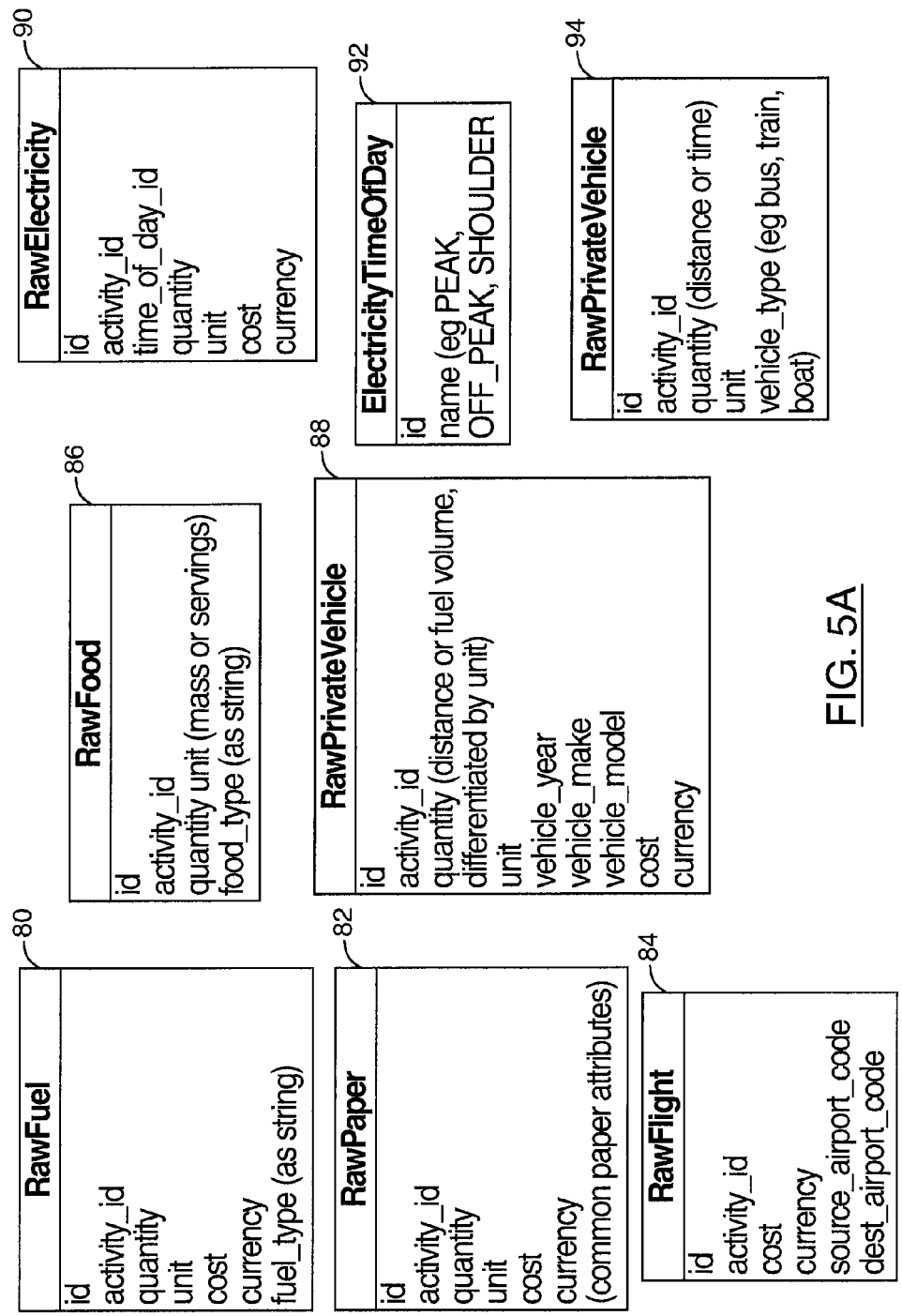
FIG. 5A is a schematic diagram of example data classes for raw activity data.

FIG. 5A is a schematic diagram of example data classes for raw activity data. Example data classes for raw activity data include: fuel class 80, paper class 82, flight class 84, food class 86, privately owned vehicle class 88, electricity class 90, electricity sub class for the time of day 92, and publicly owned vehicle class 94. The data provisioning module 32 is operable to store a raw activity data record by creating an instance of one of the raw activity classes corresponding to the activity type. Only example raw activity classes are shown and other raw activity classes may be implemented. A raw activity class can reference another class via a shared data element, also referred to as a foreign key reference. For example, the electricity class 90 data element 'time_of_day_id' references the time of day sub class 92 data element 'id'

Figure 5B:
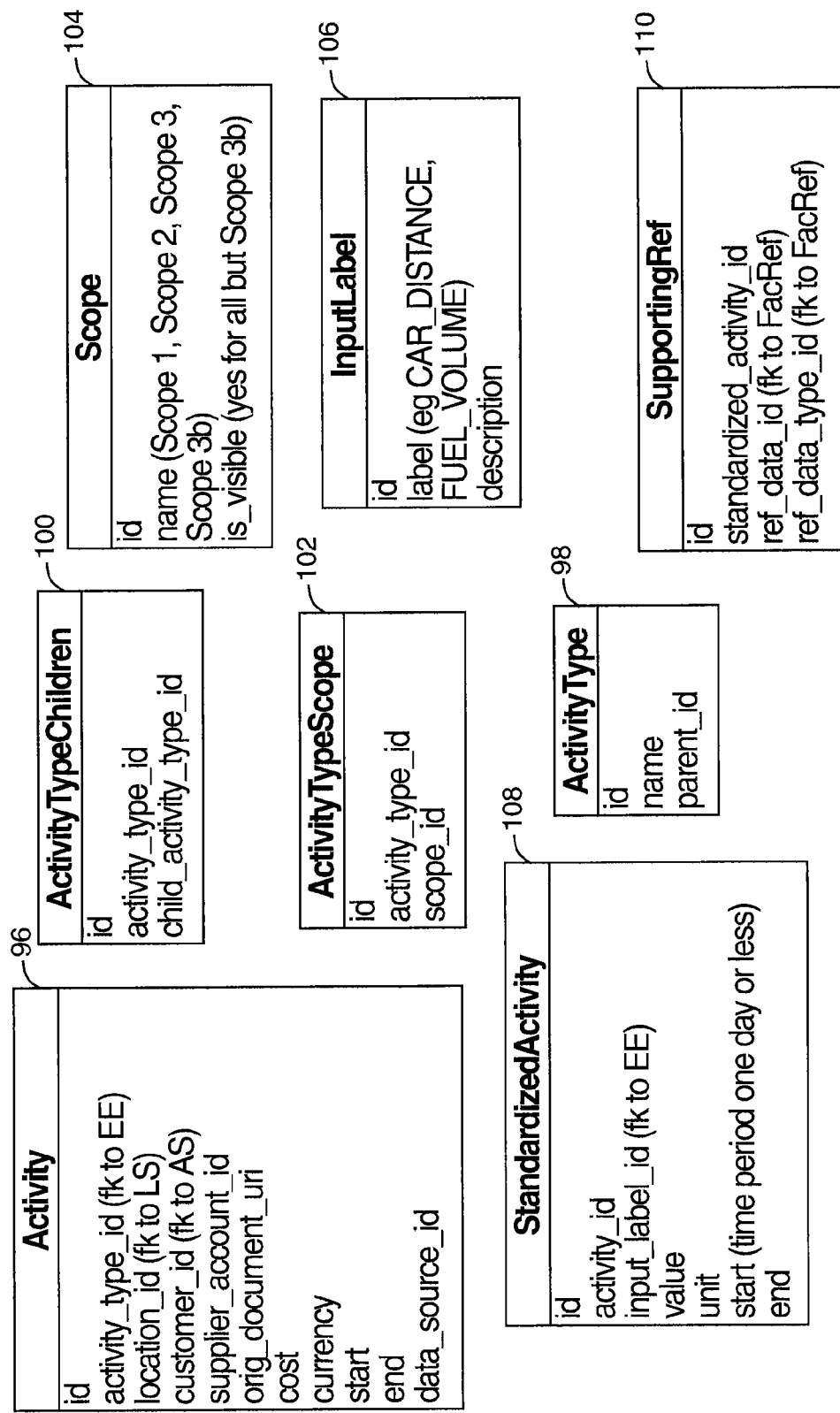
FIG. 5B is a schematic diagram of example data classes for activity data.

FIG. 5B is a schematic diagram of example data classes for activity data, including activity class 96, activity type class 98, activity type children class 100, activity type scope class 102, scope class 104, input label class 106, standardized activity class 108, and supporting reference data class 110. The data provisioning module 32 is operable to create and store an activity record by creating an instance of the activity class 96. The data provisioning module 32 is operable to create and store a standardized activity record by creating an instance of the standardized activity class 108.

As noted above, the reference data module 38 is operable to use standardized activity data as reference data (e.g., 'waste_type', 'fuel_type') and may create an association between the standardized activity data and the reference data by creating an instance of the supporting reference data class 110. The supporting reference data class 110 contains data elements ref_data_id and ref_data_type_id which are foreign key references for the reference data module 38 and reference data classes.

Each activity has an activity type. The data provisioning module 32 is operable to define an activity type by creating an instance of the activity type class 96 and links an activity record to an activity type record via the activity_type_id.

As noted above, an activity type may include nested activity types. For example, the activity type electricity may include nested activity types grid, green source, on-site, and private contract. The data provisioning module 32 is operable to define a child of an activity type by creating an instance of the activity type children class 100 and links an activity type to a activity type child via the activity_type_id and parent_id.

An activity may have a scope, which defines how the associated emission is scoped. Scope 1 is an emission that the user is directly responsible for and occurs using their property or on their premises (e.g., driving a car that the user owns). Scope 2 is an emission that occurs on the user's behalf (e.g., heating home using electricity provided by a supplier). Scope 3 are all other emissions that do not fall into scope 1 or scope 2 (e.g., passenger on a commercial plane that the user does not own). An activity may have one scope or many scopes. For example, buying a new car and driving it can have emissions that are scope 1 (consuming the fuel) and scope 3 (emissions from manufacture).

The activity type dictates the scope of the activity, and each activity type may be associated with at least one emission scope. The data provisioning module 32 is operable to define a scope by creating an instance of the scope class 104. The data provisioning module 32 is operable to create an instance of the activity type scope class 102 in order to link an activity type to a scope via the activity_type_id and scope_id.

Figure 6:
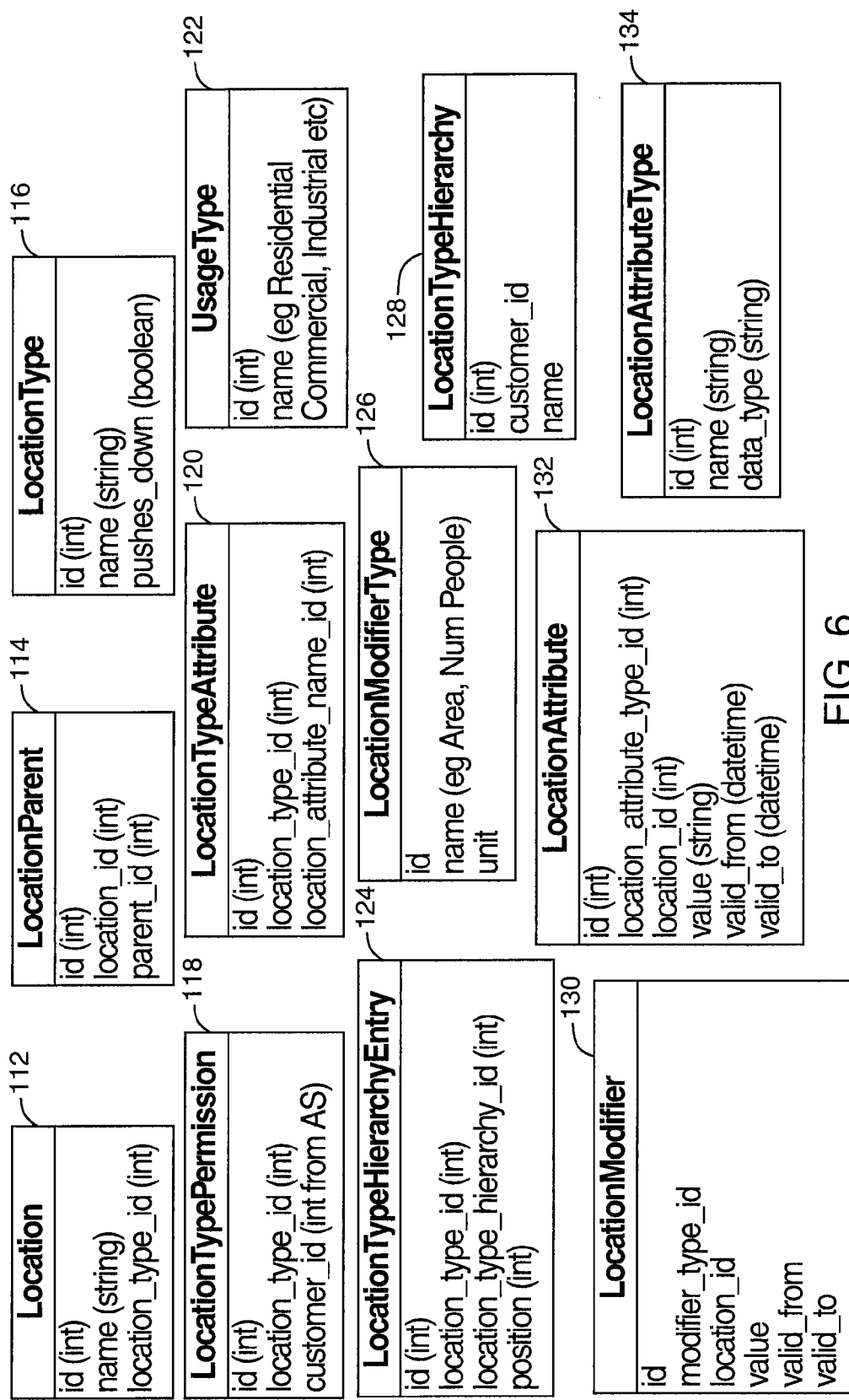
FIG. 6 is a schematic diagram of example data classes for location data.

FIG. 6 is a schematic diagram of example data classes for location data. The location module 34 is operable to define a location by creating an instance of the location class 112. Every location has a location type. For example, Toronto is a location of location type 'city'. The location module 34 is operable to define a location type by creating an instance of the location type class 116. Each location type can have 0 or more location type attributes, which is an arbitrary feature describing the location type. The location module 34 is operable to define a location type attribute by creating an instance of the location type attribute class 120.

Locations will have at least one parent location except for the special case of the location 'World' which has no parent. The location module 34 is operable to define a location parent by creating an instance of the location parent class 114. Locations may have multiple parents although a location will only have one parent of any one location type. Data elements for some location types may be pushed down to its 'children', which is tracked by a pushes_down flag in the location type object.

Location type hierarchies define the parent/child relationship between two location types (e.g., country is the parent of city). The location module 34 is operable to define a location type hierarchy by creating an instance of the location type hierarchy class 128 and by creating one or more location type entries using the location type hierarchy entry class 124 (e.g., the location types that make up the location type hierarchy). When ancestors of a specific location are requested using the location type hierarchy, the location module 34 provides one location for each location type in order from the smaller to larger (e.g., city, country, continent).

Locations may have 0 or more attributes, where an attribute is an arbitrary feature describing the location such as renting, owner, floor space for a building, etc. The location module 34 is operable to define a location attribute by creating an instance of the location attribute class 132. A location attribute has a location attribute type which contains the attribute's name and data type. The location module 34 is operable to define a location attribute type by creating an instance of the location attribute type class 114. A location may also have a specific usage and the location module 34 is operable to define a usage by creating an instance of the usage type class 122.

Some locations will be accessible only to the specific user that created them (e.g., custom locations). The location module 34 is operable to define permissions for use of a location by creating an instance of the location type permission class 118, linked to the customer via the customer_id and the location type via the location_type_id. If no location type permissions are associated with a location type then all locations of that location type are accessible to all users.

The location module 34 is operable to modify a location by creating an instance of the location modifier class 130. For example, the location Toronto head office may move to a different building or may increase the number of staff. The modification may be valid from a specific date until a specific date. Each location modifier has a type (e.g., area, number of people). The location module 34 is operable to define a location modifier and location modifier type by creating an instance of the location modifier class 130 and the location modifier type 126, respectively.

Figure 7:
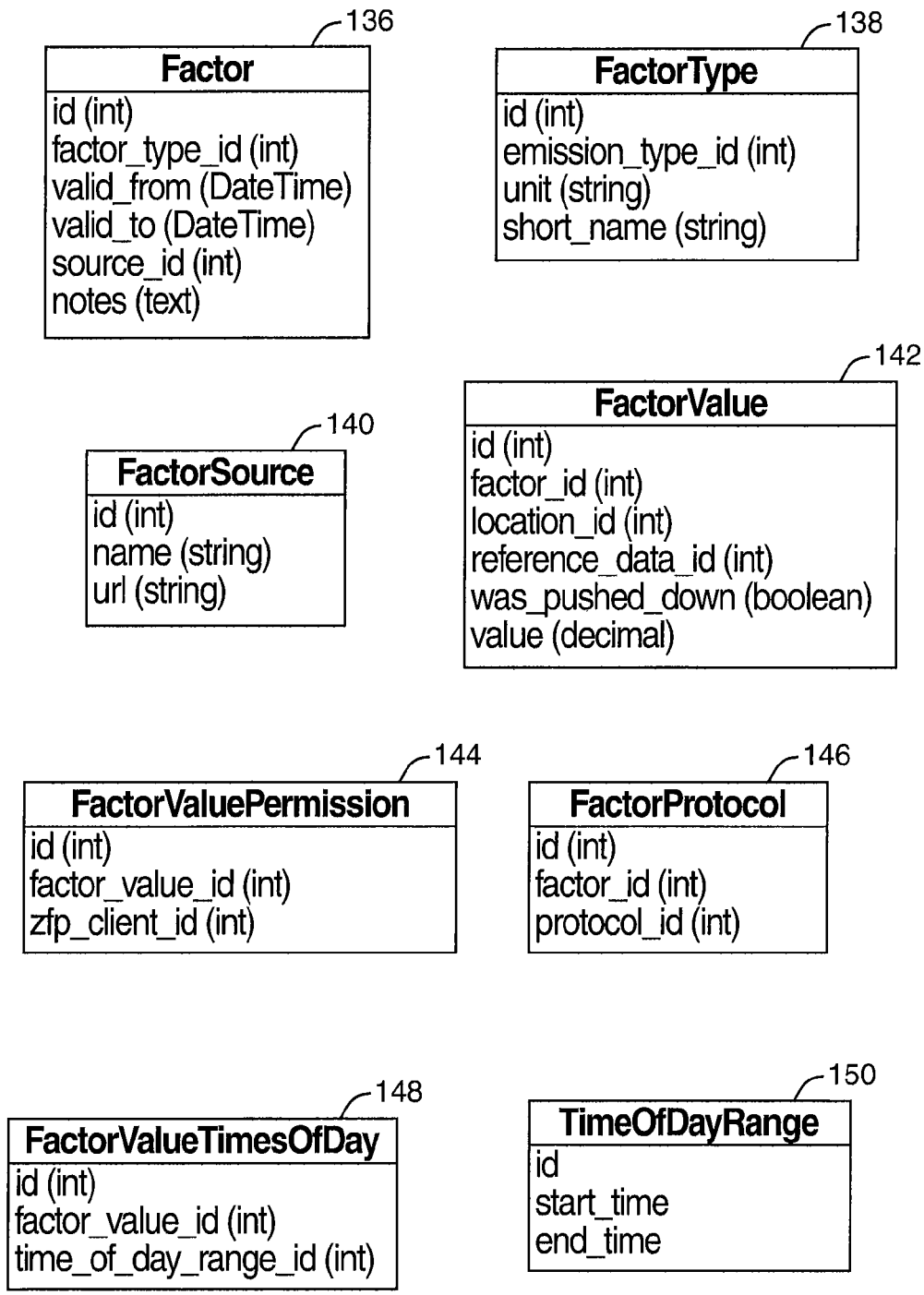
FIG. 7 is a schematic diagram of example data classes for factor data.

FIG. 7 is a schematic diagram of example data classes for factor data. The factor data module 36 is operable to define an emission factor by creating an instance of the factor class 136. Every factor has a factor type, is valid from a specific date to a specific date (or if null, then it is still valid) and may have associated research notes or accuracy metadata. The factor data module 36 is operable to define a factor type by creating an instance of the factor type class 138.

A given factor may have many values, varying by location and reference data. For example, the car emission factor of $CO_2e$/km will vary by the specific type of car and possibly location (e.g., due to variance in fuel types, altitude or temperature). The factor data module 36 is operable to define a factor value by creating an instance of the factor value class 142.

A factor value may only be valid for certain times of the day (e.g. peak electricity demand v. shoulder v. off-peak) and the factor data module 36 is operable to define the valid times of day by creating an instance of the factor value times of day class 148. The factor data module 36 defines the time of day range using the time of day range class 150. If no entry exists for the factor value times of day class 148 then the factor value is assumed valid for the entire day.

Emission factors may come from specific sources (e.g., IPCC report, GHG protocol, journal) and the factor data module 36 is operable to define a factor source by creating an instance of the factor source class 140. Factors may be valid for a specific protocol and the factor data module 36 is operable to define a factor protocol by creating an instance of the factor protocol class 146.

Factor values may be provided by specific users and will be accessible only to the specific user that created them (e.g., custom factors). The factor data module 36 is operable to define permissions for use of a factor value by creating an instance of the factor value permission class 144, linked to the user via the client_id and the factor value via the factor_value_id. If no factor value permissions are associated with a factor value then it will be accessible to all users.

Figure 8:
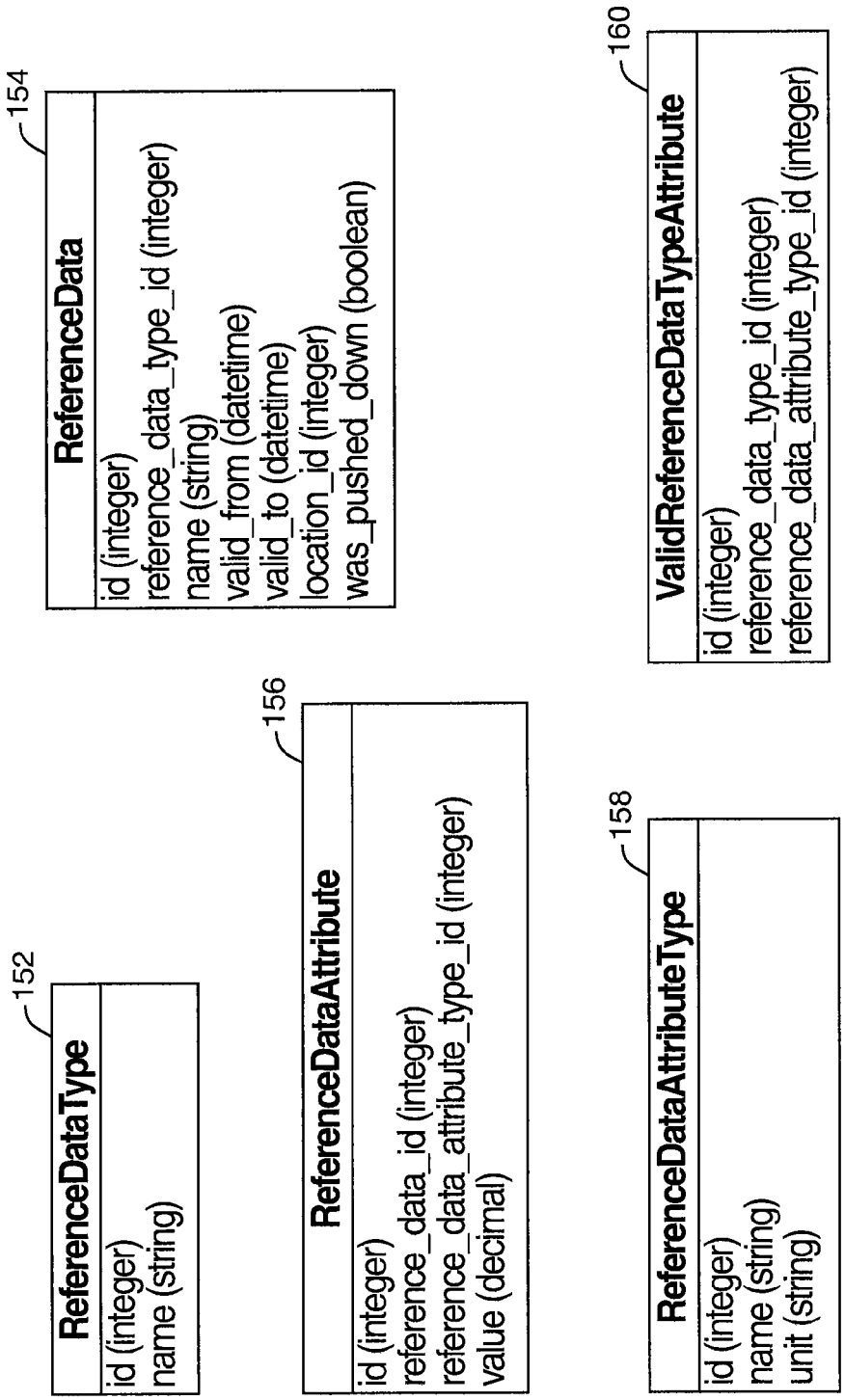
FIG. 8 is a schematic diagram of example data classes for reference data.

FIG. 8 is a schematic diagram of example data classes for reference data. The reference data module 38 is operable to define reference data by creating an instance of the reference data class 154. Reference data has a reference data type (e.g., car, airplane, chair), is valid for a location (or more if pushed down its children), is valid from a specific start date to a specific end date (or if null, then it is still valid). The reference data module 38 is operable to define a reference data type by creating an instance of the reference data type class 152.

Reference data may have 0 or more attributes, which is an arbitrary feature describing the reference data such as attribute 'make'='Toyota', attribute 'model'='Prius', etc. The reference data module 38 is operable to define a reference data attribute by creating an instance of the reference data attribute class 156. A reference data attribute has a reference data attribute type such as 'make', 'model', etc. The reference data module 38 is operable to define a reference data attribute type by creating an instance of the reference data attribute type class 158. The reference data module 38 can query for all attributes for a given reference data type (e.g., what attributes does a car have?) using the valid reference data type attribute class 160.

Figure 9:
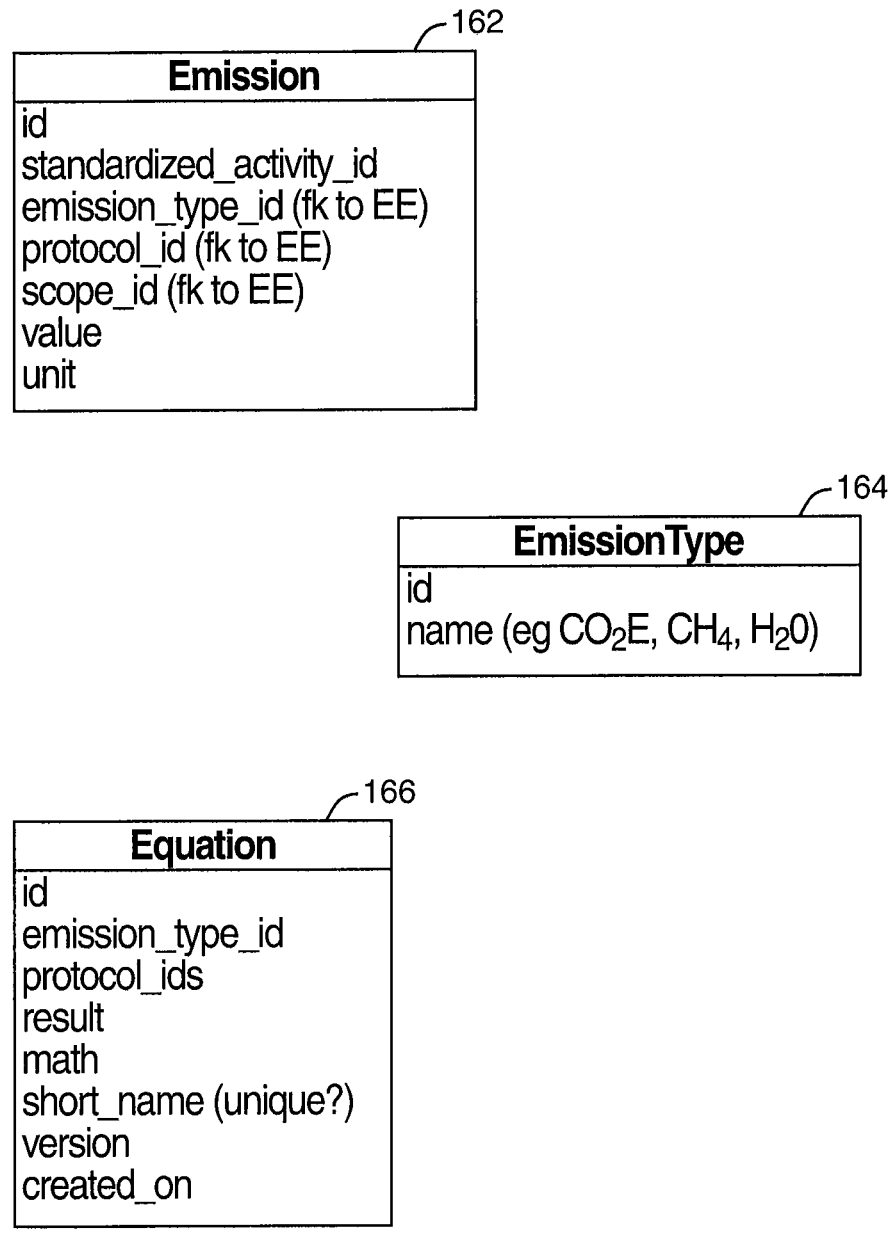
FIG. 9 is a schematic diagram of example data classes for emission and equation data.

FIG. 9 is a schematic diagram of example data classes for emission data and equations. The emission engine 40 and factor data module 36 are operable to define emission data by creating an instance of the emission class 162. An emission is calculated for a standardized activity and will have an emission value in a unit of measure. An emission may be associated with an emission type (e.g., CO2E, CH4, H2O), a protocol, and a scope. The emission engine 40 and factor data module 36 are operable to define an emission type by creating an instance of the emission type class 164. The emission engine 40 and factor data module 36 are operable to define emission equations by creating an instance of the equation class 166. An emission equation has corresponding math and a computed result in a unit of measure. An emission equation may be associated with an emission type, a protocol, a creation date, a short reference name, a version, and attributes regarding its accuracy.

In accordance with a further embodiment of the present invention, system 10 includes an API 22 that defines a set of classes and methods. The API 22 may be a secure public API that allows third parties to insert data, extract data, and use the calculation capabilities of the system. A computing device 62 (e.g. personal computer, mobile device, cell phone, personal data assistant), third party system 64, and a widget 66 can access the functionality of the emission engine 40 and other components through the API 22.

Figure 10:
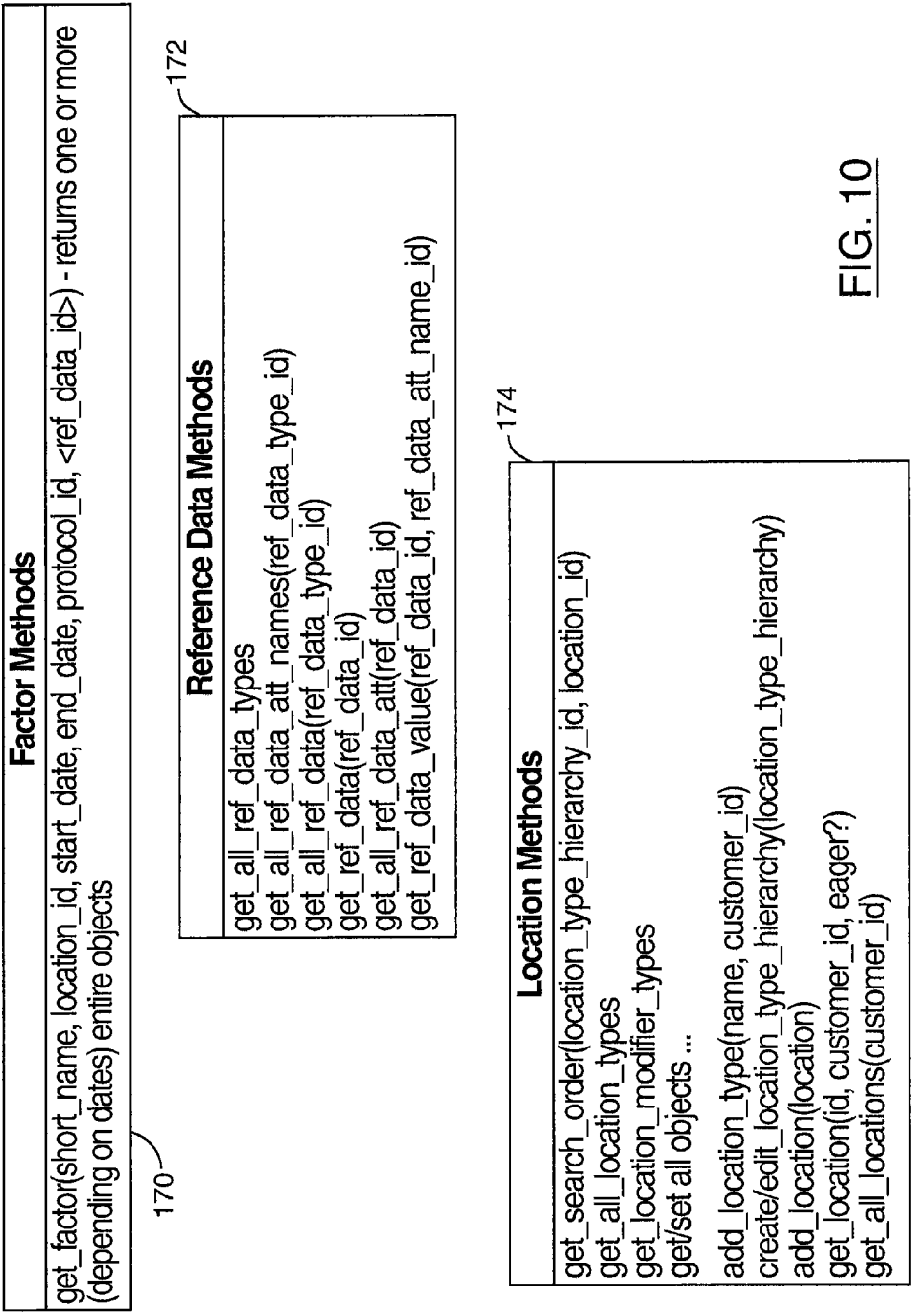
FIG. 10 is a schematic diagram of example methods for an application programming interface.

FIG. 10 is a schematic diagram of example methods provided by the API 22, including factor methods 170, reference data methods 172, and location methods 174.

Factor methods 170 provide a mechanism to query the factor data module 36 for factors given the name of the factor, the location of an activity, the time interval for an activity, a protocol, reference data, and the like. Factor methods 170 may also allow an external device to update the factor data module 36 with new factor values.

Reference data methods 172 provide a mechanism to query the reference data module 38 for reference data types, reference data attribute names, reference data, reference data attributes, reference data values and the like. Reference data methods 172 may also allow an external device to update the reference data module 38 with new reference data, reference data attributes, etc. . . .

Location methods 174 provide a mechanism to query the location module 34 for a location hierarchy, a location, a search order for a location type hierarchy, location types, location modifiers, locations for a specific user, locations of a specific type, custom locations, etc. The location methods 174 may also provide a mechanism to add or edit a location type, a location type hierarchy, a location, etc. . . .

Although only location methods 174, reference data methods 172 and factor methods 170 are shown in FIG. 10, the API 22 defines methods for querying and updating all system 10 components such as the emission engine 40, activity database 42, data provisioning module 32, etc.

In a further embodiment of the present invention, system 10 includes an inventory and payment module (IPM) 50. Generally, the IPM 50 is operable to: manage an emission credit inventory; calculate a number of emission credits required to offset the computed emission value; compute emission credit market values; and initiate an emission offset transaction based on the number of calculated emission credits, computed emission credit market values, and the emission credit inventory. Although described as a single module, the IPM 50 may be implemented as separate inventory and payment modules.

The IPM 50 is related to the concept of emission credit markets. For example, at the international level one carbon credit is equal to one ton of carbon emissions. Once carbon emissions are capped the free market can be used to allocate carbon emissions among regulated sources. The underlying concept is that free market mechanisms will drive industrial and commercial processes towards lower emission methods. Under such a model governments, industry and individuals could be assigned a pre-determined number of carbon credits based on, for example, current emissions. If an entity reduces its emissions it could sell excess carbon credits on the free market. Conversely, if an entity requires more carbon credits it must purchase them on the free market or face penalties. Similar markets could be established for any type of emission. The IPM 50 is capable of managing the emission transactions that arise under such a model. Furthermore, the IPM 50 and the emission engine 40 can work together to manage a user's emission credits and related financial transactions based on computed emission values.

Management of an emission credit inventory involves tracking the number of emission credits that a user owns, controls or requires. A user may be given some number of emission credits by a governmental organization or may be required to purchase credits from an emission credit bank, marketplace or third party. The user may be able to buy or sell emission credits at any time. Emission credits may also take the form of services where suppliers purchase bulk amounts of emission credits and sell them to customers on demand. Regardless of the form that emission credit markets take, the IPM 50 is operable to manage the number of emission credits in a users emission credit inventory using accounting practices.

Calculation of the emission credits required to offset a computed emission value requires the IPM 50 to convert the emission value calculated by the emission engine 40 into the units of measurement used by emission credits in the emission credit marketplace. Once the units of measurement are the same the IPM 50 can calculate the number of emission credits required to offset the calculated emission value. Once the emission offset number has been calculated the IPM 50 can compare the offset number to a user's emission credit inventory.

An emission offset transaction can be initiated automatically by the IPM 50 if there is a shortfall of emission credits in a user's emission credit inventory. An emission offset transaction can also be initiated manually when a user wishes to purchase or sell emission credits. An emission offset transaction allows users to purchase, sell or trade emission credits via an emission credit market, an emission credit supplier, or a third party. For example, assuming the emission engine 40 calculates that a user's activity has produced 30 tons of CO2 emissions then the IPM 50 is operable to query the user's emission credit inventory to determine if they have enough emission credits to cover the emission debt. If the user only has 20 tons of CO2 credits available in their inventory then the user clearly has a CO2 emission debt of 10 tons. This debt could be saved in the user's inventory or corrected using an emission offset transaction.

To associate an emission offset transaction with a value the IPM 50 is operable to calculate the market value associated with emission credits. This may involve obtaining pricing information from service providers, thirds parties, or calculating the cost of emission credits based on market conditions.

The IPM 50 is also operable to process payments relating to emission values though not necessarily using an emission credit trading model as described above. Users may wish to purchase other wares or services in order to offset their emissions. For example, an individual may wish to purchase some trees to be planted on their behalf in order to offset a recent flight. These types of transactions can also be processed using the IPM 50.

In accordance with a further embodiment of the present invention, system 10 may include a question tree module 48. The input module 30 may receive the raw activity data via the question tree module 48. The question tree module 48 is operable to: compute a question tree comprising a root node, a plurality of branch nodes, and a plurality of question nodes. The question tree module 48 provides a first question to a user based on the question tree, receives raw activity data in response to the first question and provides the raw activity data to the input module.

In a further embodiment of the invention, the question tree module 48 is also operable to: re-configure the question tree using at least some of the received raw activity data, provide a second question to the user based on the re-configured question tree, and receive additional raw activity data in response to the second question. The question tree module 48 then provides the additional raw activity data to the input module 30.

A question tree is an acyclic connected graph that has a root node with no parent node. Every other node in the tree has zero or more children and at most one parent node. The leaf or terminal nodes of a question tree contain questions that can be presented to a user. The internal nodes of a question tree, or nodes having one or more children, can represent hierarchical activity groups or activity types. The objective of traversing a question tree is to prompt a user, via the questions contained in leaf nodes, to input all the raw activity data required to calculate an emission for a given activity type. For example, an internal node of the question tree could represent an activity type such as driving. The driving node could have leaf node children comprised of questions relating to the start date, end date, location, unit of measure and consumption values necessary to form the basic raw activity data for the driving activity type.

The question tree can exist as one world tree containing all the possible questions and activities for all customers, or it could be implemented as individual smaller trees. Different emission calculations may use different question trees or sub-trees of a larger question tree. In prompting users for input the leaf nodes of a question tree may provide users with pre-populated response options such as a pick list or default value. The data for these pre-populated options may be comprised of factor or reference data obtained from the factor data module 36 and the reference data module 38. The question tree and data used by the question tree can also be customized or configured based on customer preferences. For example, the reference data and nodes in the question tree can be associated with meta-data that defines the validity of the node or data for a particular customer.

The nodes of a question tree can also be dependent upon other nodes in the question tree. As nodes in a tree are strictly ordered dependencies between nodes can be clearly defined in a hierarchical fashion. Referring to the driving example above, a leaf node in the question tree could provide the first question "What car did you drive?" and the next question node could provide the second question "What is the fuel efficiency of your vehicle?". If a user inputs a model or type of vehicle in response to the first question the factor data module 36 and the reference data module 38 can be queried to determine a default fuel efficiency for the vehicle. This information can be used to pre-populate the response to the second question. If the user wishes to override the default response provided in the second question they could do so. In this manner the question tree module 48 can configure itself based on the answers to previous questions by having nodes that depend upon the answers to previous nodes in the tree.

In accordance with a further embodiment of the present invention, the system 10 may include a translation module 54. The translation module 54 is operable to translate and modify the display of text and variant preferences used by any components of the system 10 during user interaction. The translation process may be referred to as internationalization and may extend to concepts such as colors, numbers, fonts, writing conventions, input prompts and the like. For example, default units of measure could be defined for the emission engine 40 calculations or for questions presented to a user by the question tree module 48. Text and variant preferences can be translated and modified automatically using the translation module 54 in response to a locale variable that can be set by a client during use or hard coded into the system 10. In one embodiment, a client side filtering mechanism may be used to read the language preferences of a browser to determine a web client's preferred language and to set the locale variable. The web client would then transmit the locale variable when making requests to the data provisioning module 32. In another embodiment, a client's account information may be stored and accessed by a security service module (not shown) to define a preferred locale. Whenever a client uses the system 10 the security service module could set the users locale.

The actual process of translation may be implemented in many ways. In an exemplary embodiment textual elements are stored as strings in a database for a given locale. The translation module 54 is operable to retrieve the appropriate string from the database in response to a request for a specific string and given a locale. For example, a button labeled "Hello" in English and "Bonjour" in French would be stored as two strings, one with a locale of French and one with a locale of English. The identifier for this string would be the same, for example "hello_button_label". The system, or a client, could therefore make a request to the translation module (54) for "hello_button_label" in locale French, which would return "Bonjour" or in locale English, which would return "Hello". Furthermore, the translation module (54) allows clients to customize locale settings by inserting their own specific translations for strings that take precedence over the base locale settings. Continuing the above example, a company could modify the hello button string so that it reads "Welcome" for the English locale by adding a client customization or by overwriting the string stored in the database for the English locale. All other base translation strings could be left the same for the English locale.

By internationalizing the system 10 using the translation module 54 the user interface elements of the system 10 can easily be adapted for use globally. This would permit, for example, more accurate information gathering using native languages and user interface customs. Internationalizations and resource files can be customized.

In accordance with a further embodiment of the present invention, the data provisioning module 32 is further operable to receive a query for attributes of the at least one computed emission value and provide an additional emission value, calculation or report in response to the query. As previously established, once an emission value is computed it is stored in the emission database 44. This emission value includes the calculated amount of the emission as well as associated meta-information or attributes including the location, time interval, and other activity data from which the emission amount was derived from. Accordingly, the computed emission value may be a data structure associating the calculated amount of the emission with various attributes regarding relevant aspects of the raw activity data or standardized activity data, as stored in the activity database 42.

As noted above, an activity must be associated with a location and a user can create custom locations for their activities, thereby customizing their location hierarchy.

Locations can also be divided into location classifications. These classifications behave conceptually like location nodes 72 in a location hierarchy tree 70 (FIGS. 2 and 3) in that they organize a location relative to other locations. Location classifications are principally used for accounting purposes and are generally not associated with emission factors. Location classifications are different from location hierarchies and do not need to be stored as part of the location hierarchy but may be stored in another table or database. Location classifications can store information or attributes including: the classes parent class or location; the classes physical size; the number of people associated with the class; the name of the class; the percentage, ratio or amount of a parent's emissions that the class generates; and the nature or type of classification. Location classifications, like locations, can be arranged hierarchically or they may be implemented as a non-hierarchical set of divisions for a given location in the location hierarchy.

Locations, location classifications and emission values can all be stored in databases accessible via the ESB 28 and are associated with meta-information or attributes that describe the nature of the data being stored. This data can be queried by the data provisioning module 32, or other modules, in order to generate reports, perform calculations or produce new emission value objects. The data provisioning module 32 can use these reports, calculations and objects to aggregate, distribute or otherwise manipulate emission values using the meta-information or attributes stored in the location hierarchy, location classes and emission values. The meta-information or attributes can also be used to assign emission values to certain locations or location classes for the purposes of tracking and reporting.

For example, a company has a main office in Toronto, which is associated with the location hierarchy Toronto-Ontario-Canada-World. In relation to Toronto, the company has added the following location classifications:

| Class Name | #People | Size (m$^2$) | Parent | Percentage |
|---|---|---|---|---|
| Main Office | 100 | 500 | Toronto | 100 |
| Sales | 20 | 100 | Main Office | 50 |
| Marketing | 70 | 300 | Main Office | 20 |
| Research | 10 | 100 | Main Office | 30 |

If the company provides raw activity data with the location Toronto the emission engine will calculate an emission value and store the emission values in the emission database 44, a variety of reports and calculations can be executed using this single emission value and the classes and attributes defined above. For example, a report could be run that distributes and displays the emission value for the Toronto location to the Sales, Marketing and Research location classes based on the pre-defined percentages. Alternatively, the emission value for the Toronto location could be manually distributed to the location classes using a user interface that displays the location classes if there were no pre-defined percentages or if the percentages needed to be overridden. A report could also be run to determine or display the emissions per person or the emissions per square meter for each location class. Finally, emissions could be assigned to classes in the location classes, or locations in the location hierarchy. For example, the company may need to report only emissions for Ontario and all location nodes that are children for Ontario should be aggregated and their emission values assigned to the Ontario location.

It should be clear from the foregoing that the power of reporting and calculating is not necessarily limited to assignment, aggregation and distribution. It should also be clear that the more attributes the location classifications store the more powerful the reporting and calculation tools can become. For example, location classes could also store attributes or information that defines expenses thereby enabling financial reports to be generated such as dollars saved per unit of emissions.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

We claim:

1. A computer system for computing emission values, the computer system comprising a processor and a computer readable storage medium storing instructions, the instructions being executable to configure the processor to provide:
- an input module operable to receive raw activity data to define a record for an activity, wherein the raw activity data comprises: an activity type; a time interval; a location; a unit of measure; and a consumption value;
- a data provisioning module operable to convert the raw activity data into one or more standardized activities by dividing the time interval for the raw activity data into one or more sub-intervals of time and defining a standardized activity for each of the sub-intervals of time, wherein each standardized activity corresponds to a subset of the raw activity data;
- a location module operable to compute a location hierarchy for a given location, wherein the location hierarchy comprises nodes, wherein each node corresponds to a location wherein the nodes are arranged relative to each other from a specific location to general location to represent different levels of granularity for the location of the activity;
- a factor data module operable to, for each standardized activity, compute, using the processor, emission factors based on the location hierarchy and the sub-interval of time for the respective standardized activity, wherein each emission factor is valid for the sub-interval of time and one or more locations correspond to the nodes of the location hierarchy, wherein an emission factor valid for a more specific location will be chosen over an emission factor valid for a more general location;
- a reference data module operable to, for each standardized activity, compute reference data from the subset of raw activity data;
- an emission engine operable to:
  - for each standardized activity:
    - determine at least one optimal emission equation wherein the at least one optimal emission equation is valid for the activity type, the sub-interval of time and one or more locations corresponding to the nodes of the location hierarchy; and
    - compute at least one emission value for the respective standardized activity using the at least one optimal emission equation, the reference data, and the emission factors; and
  - compute, using the processor, at least one emission value for the activity using the emission values for the standardized activities.

2. The system of claim 1 wherein the input module is operable to interface with an application programming interface for a plurality of computing devices.

3. The system of claim 1 further comprising a bulk upload module operable to receive raw activity data as bulk data from an enterprise client and provide the raw activity data to the input module.

4. The system of claim 1 further comprising a question tree module operable to:
- compute a question tree comprising a root node, a plurality of branch nodes, and a plurality of question nodes;
- provide a first question to a user based on the question tree;
- receive raw activity data in response to the first question; and
- provide the raw activity data to the input module.

5. The system of claim 4 wherein the question tree module is further configured to:
- re-configure the question tree using at least some of the received raw activity data;
- provide a second question to the user based on the re-configured question tree; and
- receive additional raw activity data in response to the second question.

6. The system of claim 1 further comprising an inventory and payment services module operable to:
- manage emission credit inventory;
- calculate a number of emission credits required to offset the computed emission value;
- compute emission credit market values; and
- initiate an emission offset transaction based on the number of calculated emission credits; computed emission credit market values; and emission credit inventory.

7. The system of claim 1 wherein the input module is further operable to receive a user identifier; and wherein the location module is further operable to customize a location hierarchy for a user associated with the user identifier, wherein the customized location hierarchy includes one or more nodes specific to the user; and wherein the customized location hierarchy may be queried using the user identifier.

8. The system of claim 1 wherein the location hierarchy is a tree comprised of parent and children nodes; wherein each node corresponds to a geographic location; wherein each parent node corresponds to a geographic region at least as large as the aggregate of its children; and wherein each child node- has only one parent node.

9. The system of claim 1 wherein the at least one optimal emission equation is associated with a time period, an emission type and a protocol.

10. The system of claim 1 wherein the factor data module is further operable to; associate each emission factor with at least one source, at least one location, a valid start date, and a valid end date; determine which emission factors are valid for at least a portion of the sub-interval of time for the respective standardized activity; determine which emission factors are valid for locations defined by the location hierarchy; and rank the valid emission factors from most accurate to least accurate to compute a list of ranked valid emission factors.

11. The system of claim 10 wherein the factor data module is further operable to receive emission factors specific to a user and associate the emission factors with the user.

12. The system of claim 1 wherein the data provisioning module is further operable to:
- convert the unit of measure and consumption value for the raw activity data into a standard unit of measure and a corresponding consumption value;
- associate a portion of the corresponding consumption value in the standard unit of measure to each standardized activity based on the sub-interval of time for the respecfive standardized activity; and
- associate an input label with each standardized activity, where the input label is based on the activity type and defines how the emission value for the standardized activity will be calculated.

13. A method for computing emission values, wherein the method is implemented on a processor and a computer readable storage medium storing instructions, the instructions being executable to configure the processor to perform operations comprising:

receiving raw activity data for an activity, wherein the raw activity data comprises: an activity type; a time interval; a location of the activity; a unit of measure; and a consumption value;

converting the raw activity data into one or more standardized activities by dividing the time interval for the raw activity data into one or more sub-intervals of time and defining a standardized activity for each of the sub-intervals of time, wherein each standardized activity corresponds to a subset of the raw activity data;

computing a location hierarchy corresponding to the location of the activity, wherein the location hierarchy comprises nodes, wherein each node corresponds to a location, wherein the nodes are arranged relative to each other from a specific location general location to represent different levels of granularity for the location of the activity;

for each standardized activity:
 computing, using the processor, emission factors based on the location hierarchy and the sub-interval of time for the respective standardized activity, wherein each emission factor is valid for the sub-interval of time and one or more locations corresponding to the nodes of the location hierarchy, wherein an emission factor valid for a more specific location will be chosen over an emission factor valid for a more general location;
 computing reference data from the subset of raw activit data;
 determining at least one optimal emission equation, wherein the at least one optimal emission equation is valid for the activity type, the sub-interval of time and one or more locations corresponding to the nodes of the location hierarchy; and
 computing at least ore emission value for the standardized activity using the at least one optimal emission equation, the reference data, and the emission factors;
computing, using the processor, at least one emission value for the activity using the emission values for the standardized activities.

14. The method of claim 13 further comprising:
computing a question tree, wherein the question tree comprises a root node, a plurality of branch nodes, and a plurality of question nodes;
providing a first question generated using the question tree to a user;
receiving raw activity data in response to the first question.

15. The method of claim 14 further comprising:
re-configuring the question tree in response to at least some of the received raw activity data; and
providing an additional question generated using the re-configured question tree to the user; and
receiving additional raw activity data in response to the additional question.

16. The method of claim 15 further comprising traversing the question tree by dynamically repeating the steps of: re-configuring the question tree; providing an additional question; and receiving additional raw activity data.

17. The method of claim 13 further comprising:
managing emission credit inventory;
calculating a number of emission credits requited to offset the computed emission value;
computing emission credit market values;
initiating an emission offset transaction based on the number of calculated emission credits, computed emission credit market values, and the emission credit inventory.

18. The method of claim 13 further comprising:
receiving a user identifier corresponding to a user;
customizing the location hierarchy for the user, wherein the customized location hierarchy includes one or more nodes specific to the user; and
retrieving the customized location hierarchy using the user identifier.

19. The method of claim 13 wherein the step of converting the raw activity data into one or more standardized activities comprises:
converting the unit of measure and consumption value for the raw activity data into a standard unit of measure and a corresponding consumption value; and
associating a portion of the corresponding consumption value in the standard unit of measure with each standardized activity based on the sub-interval of time for the respective standardized activity.

20. The method of claim 13 wherein the emission factors receive at least some of the reference data as one or more parameters, and wherein the at least one optimal emission equation receives at least some of the emission factors as one or more parameters.

21. The method of claim 20 wherein computing the at least one emission value for the activity comprises:
aggregating the emission values for the standardized activities.

22. The method of claim 13 wherein the step of converting raw activity data into one or more standardized activities comprises:
associating an input label for the activity based on the activity type, wherein the input label defines how the emission value for the respective standardized activity will be calculated.

23. The method of claim 13 wherein the step of determining at least one optimal emission equation comprises:
storing a plurality of emission equations in a database, wherein each emission equation is associated with a protocol and an activity type;
determining a set of emission equations from the plurality of emission equations, wherein each emission equation in the set of emission equations matches at least some of the subset of raw activity data corresponding to the standardized activity data, the reference data and the emission factors;
ranking each emission equation in the set of emission equations, wherein the rank relates to the accuracy of the emission equation given the subset of raw activity data corresponding to the standardized activity, the reference data and the emission factors; and
selecting the at least one optimal emission equation from the ranked set of emission equations.

24. The method of claim 13 further comprising receiving one or more emission equations specific to a user and associating the one or more emission equations with a user identifier.

25. The method of claim 13 further comprising receiving emission factors specific to a user and associating the emission factors with the user.

26. The method of claim 13 wherein the method further comprises:
associating each emission factor with at least one source, at least one location, a valid start date, and a valid end date;
determining which emission factors are valid for the sub-interval of time of the respective standardized activity;
determining which emission factors are valid for locations defined by the location hierarchy;

ranking the valid emission factors from most accurate to least accurate to compute a list of ranked valid factors.

27. A non-transitory computer-readable medium upon which a plurality of instructions are stored, the instructions for performing the steps of the method as claimed in claim 13.

* * * * *